United States Patent
Li et al.

(10) Patent No.: US 12,542,624 B2
(45) Date of Patent: Feb. 3, 2026

(54) LOW DENSITY PARITY CHECK CODING AND DECODING METHODS, COMMUNICATION DEVICE, AND STORAGE MEDIUM

(71) Applicant: ZTE CORPORATION, Guangdong (CN)

(72) Inventors: Liguang Li, Shenzhen (CN); Jin Xu, Shenzhen (CN); Chulong Liang, Shenzhen (CN); Jun Xu, Shenzhen (CN); Guanghui Yu, Shenzhen (CN); Qiang Fu, Shenzhen (CN); Jian Kang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 18/703,018

(22) PCT Filed: Dec. 29, 2022

(86) PCT No.: PCT/CN2022/143130
§ 371 (c)(1),
(2) Date: Apr. 19, 2024

(87) PCT Pub. No.: WO2023/125746
PCT Pub. Date: Jul. 6, 2023

(65) Prior Publication Data
US 2025/0279848 A1    Sep. 4, 2025

(30) Foreign Application Priority Data
Dec. 30, 2021   (CN) .................... 202111654480.X

(51) Int. Cl.
*H04L 1/00* (2006.01)
*H03M 13/00* (2006.01)

(52) U.S. Cl.
CPC .......... *H04L 1/0057* (2013.01); *H04L 1/0052* (2013.01); *H04L 1/0067* (2013.01); *H03M 13/00* (2013.01)

(58) Field of Classification Search
CPC ... H04L 1/0057; H04L 1/0052; H04L 1/0067; H04L 1/0003; H03M 13/6381;
(Continued)

(56) References Cited

U.S. PATENT DOCUMENTS 10,892,778 B2 *   1/2021   Xu ..................... H03M 13/1148
11,233,604 B2 *   1/2022   Kim ..................... H03M 13/05
(Continued)

FOREIGN PATENT DOCUMENTS

| CN | 108234064 A | 6/2018 |
| CN | 108270448 A | 7/2018 |

(Continued)

OTHER PUBLICATIONS

3rd Generation Partnership Project, "Design of LDPC Codes for NR", 3GPP TSG RAN WG1 Meeting #87, Reno, USA, Nov. 14-18, 2016, 11 pages.
(Continued)

*Primary Examiner* — Justin R Knapp
(74) *Attorney, Agent, or Firm* — Dority & Manning, PA

(57) ABSTRACT

The present disclosure provides coding and decoding methods, a communication device, and a storage medium. The coding method, applied to a first transmission node, includes: determining a base matrix for low density parity check (LDPC) coding from a preset base matrix set; performing LDPC coding on original data according to the base matrix, so as to obtain coded data; transmitting the coded data to a second transmission node; wherein the base matrix includes two kinds of elements: an element indicating an all-zero square matrix, and an element indicating a cyclic
(Continued)

shift of an identity matrix; the base matrix set includes at least two non-empty subsets of base matrices, and all base matrices in each subset of the at least two non-empty subsets of base matrices have a same coding rate.

19 Claims, 6 Drawing Sheets

(58) Field of Classification Search
CPC ............. H03M 13/116; H03M 13/618; H03M 13/1168; H03M 13/6362; H03M 13/036; H03M 13/6516; Y02D 30/70
See application file for complete search history.

(56) References Cited

U.S. PATENT DOCUMENTS

| | | | |
|---|---|---|---|
| 11,881,870 B2* | 1/2024 | Montorsi | ............ H03M 13/616 |
| 2020/0028523 A1* | 1/2020 | Li | ........................ H03M 13/036 |
| 2021/0013901 A1 | 1/2021 | Li et al. | |
| 2021/0297091 A1 | 9/2021 | Shin et al. | |
| 2022/0085830 A1 | 3/2022 | Li et al. | |
| 2024/0048160 A1* | 2/2024 | Li | ........................ H03M 13/116 |

FOREIGN PATENT DOCUMENTS

| | | |
|---|---|---|
| CN | 111162797 A | 5/2020 |
| CN | 111277354 A | 6/2020 |

OTHER PUBLICATIONS

PCT International Search Report and Written Opinion (with English translation) for corresponding PCT Application No. PCT/CN2022/143130, dated Mar. 22, 2023, 13 pages.

3rd Generation Partnership Project, "Final Report of 3GPP TSG RAN WG1 #107bis-e v1.0.0 (Online meeting, Jan. 17-25, 2022)", 3GPP TSG RAN WG1 Meeting #108-e, e-Meeting, Feb. 21-Mar. 3, 2022, 82 pages.

3rd Generation Partnership Project, "LDPC rate compatible design overview", 3GPP TSG-RAN WG1 #86bis, Oct. 10-14, 2016, Lisbon Portugal, 27 pages.

3rd Generation Partnership Project, "Design of LDPC Codes for NR", 3GPP TSG RAN WG1 Meeting #87, Reno, USA, Nov. 14-16, 2016, 11 pages.

Extended European Search Report for corresponding Application No. EP22914996.8, dated Nov. 17, 2025, 34 pages.

* cited by examiner

LOW DENSITY PARITY CHECK CODING AND DECODING METHODS, COMMUNICATION DEVICE, AND STORAGE MEDIUM

CROSS-REFERENCE TO RELATED APPLICATION(S)

This application is a national phase entry under 35 USC 371 of International Patent Application No. PCT/CN2022/143130 filed on Dec. 29, 2022, the International Patent Application is filed based on Chinese Patent Application with the application Ser. No. 20/211,1654480.X, filed on Dec. 30, 2021, and claims priority to the Chinese Patent Application, the entire contents of the International Patent Application and the Chinese Patent Application are incorporated herein by reference.

TECHNICAL FIELD

The present disclosure relates to the field of communication, and specifically to a coding method, a decoding method, a communication device and a storage medium.

BACKGROUND

With the rapid development of technologies such as big data, cloud computing, delay-sensitive network, etc., a number of user equipments in a wireless communication network shows explosive growth, and the wireless communication network will carry diverse applications and massive data, which puts a high requirement on data transmission rate, throughput, data error correction, etc. In a wireless communication system, a transmitting end performs channel coding on to-be-transmitted data to obtain a coded bit sequence, then maps the coded bit sequence into a constellation modulated symbol and transmits the constellation modulated symbol to a receiving end. In a data transmission channel, data transmission is distorted due to the influence of factors such as multipath, movement, noise, and interference. The receiving end needs to perform channel decoding on the received constellation modulated symbol, so as to recover the transmitted data. In the channel coding process, some redundant information is added to the transmitted data sequence, and thus, the receiving end may check and recover original data accordingly.

A low density parity check (LDPC) code is a linear block code defined using a sparse parity check matrix or a bipartite graph. Since the parity check matrix is very sparse, the complexity of decoding may be reduced, and a high degree of decoding parallelism may be achieved, decoding throughput is large, thus the parity check matrix is currently used in many communication standards. However, there are some problems in the currently used LDPC code, such as error floor, which limit its usage in ultra-high reliability transmission, and limit the maximum parallelism adopted in hierarchical decoding and limit the decoding throughput.

SUMMARY

Embodiments of the present disclosure provide a coding method, applied to a first transmission node, where the method includes:
  determining a base matrix for low density parity check (LDPC) coding from a preset base matrix set;
  performing LDPC coding on original data according to the base matrix, so as to obtain coded data;
  transmitting the coded data to a second transmission node;
  where the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate.

The embodiments of the present disclosure provide a decoding method, applied to a second transmission node, where the method includes:
  receiving coded data transmitted by a first transmission node;
  determining a base matrix for low density parity check (LDPC) decoding from a preset base matrix set;
  performing LDPC decoding on the coded data according to the base matrix, so as to obtain original data;
  where the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate.

The embodiments of the present disclosure provide a communication device, including: a communication module, a memory, and one or more processors;
  the communication module is configured to perform communication interaction between transmission nodes;
  the memory is configured to store one or more programs;
  the one or more programs, upon being executed by the one or more processors, cause the one or more processors to implement the method in any of the embodiments described above.

The embodiments of the present disclosure provide a storage medium having stored a computer program thereon, the computer program, upon being executed by a processor, implements the method in any of the embodiments described above.

DETAILED DESCRIPTION

Figure 1:
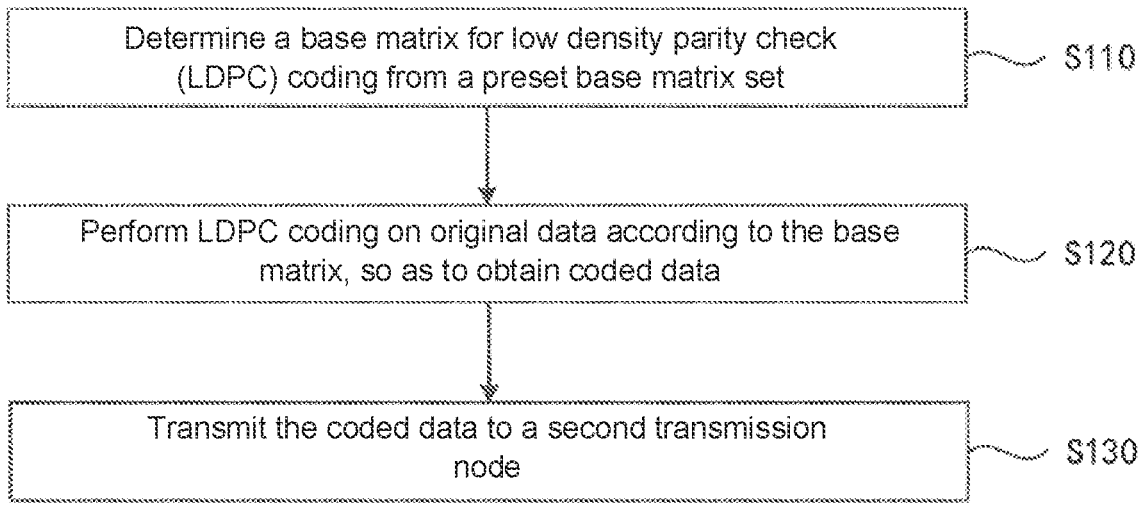
FIG. 1 is a flowchart of a coding method provided by the embodiments of the present disclosure.

In a digital communication system, a transmitting end acquires a coded bit sequence after channel coding is performed on an original information sequence, then maps the coded bit sequence to obtain a constellation modulated symbol, and finally transmits the obtained constellation modulated symbol. In a channel, data transmission is distorted due to the influence of factors such as multipath, movement, noise, interference. A receiving end first receives constellation modulated symbol data passed through the channel, the modulated symbol data at this time has been distorted, and channel decoding is needed to recover the original information sequence. Herein, channel coding refers to forward error correction (FEC) coding, where some redundant information is added into an information sequence by forward error correction coding, the receiving end may reliably recover an original information sequence according to a corresponding forward error correction coding principle.

The LDPC code is a coding method for forward error correction coding. The LDPC code is a linear block code that may be defined by using a very sparse parity check matrix or a bipartite graph. Since the parity check matrix is very sparse, low complexity of decoding may be achieved. The parity check matrix H of the LDPC code is a matrix with mb×z rows and nb×z columns, which consists of mb×nb sub-matrices, and each of the sub-matrices is different powers of a standard permutation matrix of z×z (corresponding to a cyclic shift matrix of an identity matrix), or an all-zero square matrix of z×z. The parity check matrix H has the following form:

$$H = \begin{bmatrix} P^{h^b_{0,0}} & P^{h^b_{0,1}} & P^{h^b_{0,2}} & \dots & P^{h^b_{0,nb-1}} \\ P^{h^b_{1,0}} & P^{h^b_{1,1}} & P^{h^b_{1,2}} & \dots & P^{h^b_{1,nb-1}} \\ \dots & \dots & \dots & \dots & \dots \\ P^{h^b_{mb-1,0}} & P^{h^b_{mb-1,1}} & P^{h^b_{mb-1,2}} & \dots & P^{h^b_{mb-1,nb-1}} \end{bmatrix} = P^{Hb}$$

If $h_{ij}^b = -1$, $P^{h_{ij}^b} = 0$, which is an all-zero square matrix of z×z; if $h_{ij}^b$ is an integer greater than or equal to 0, a corresponding sub-matrix is $h_{ij}^b$ power of the standard permutation matrix P (i.e., a cyclic shift of an identity matrix, a number of shifts is equal to $h_{ij}^b$), the standard permutation matrix P of z×z is as follows (the standard permutation matrix may be formed by shifting the identity matrix to the right by 1 bit):

$$P = \begin{bmatrix} 0 & 1 & 0 & \dots & 0 \\ 0 & 0 & 1 & \dots & 0 \\ \dots & \dots & \dots & \dots & \dots \\ 0 & 0 & 0 & \dots & 1 \\ 1 & 0 & 0 & \dots & 0 \end{bmatrix}$$

Thus, $h_{ij}^b$ may uniquely identify each sub-matrix, if a certain sub-matrix is an all-zero square matrix, the corresponding $h_{ij}^b$ is denoted by −1 (also denoted by using a null value), and if a certain sub-matrix is obtained by a cyclic shift of the identity matrix, $h_{ij}^b$ is equal to s. Thus, all the $h_{ij}^b$ may form a base matrix Hb, i corresponds to a row index of the base matrix, and j corresponds to a column index of the base matrix. Therefore, the base matrix Hb is a matrix of mb×nb, which includes 2 kinds of elements including: an element indicating an all-zero square matrix, and an element indicating a cyclic shift of an identity matrix (indicating a size of the cyclic shift).

z is a dimension of the standard permutation matrix (sub-matrix), z may be referred to as a lifting size, an extending factor, or a sub-matrix size. Correspondingly, a base graph matrix (base graph) of the LDPC code may be obtained by replacing in the base matrix, all non-"−1" elements with "1" and all −1 elements with "0". The base graph matrix of the LDPC code includes two kinds of elements: "0" and "1", where "0" is used to indicate that a corresponding index position is an all-zero square matrix, and "1" is used to indicate that a corresponding index position is a cyclic shift of the identity matrix (a size of the cyclic shift is not indicated). Herein, the base graph matrix may decide the decoding performance of the LDPC code, and also decide optimization of a routing network in an LDPC decoder; therefore, the decoding performance of the LDPC code and the decoding hardware implementation may be improved through a design of the base graph matrix.

For example, 1 LDPC code base matrix (2 rows and 4 columns) is as follows, with a lifting size equal to 4:

$$\begin{bmatrix} 0 & 3 & 0 & -1 \\ 2 & 3 & 2 & 3 \end{bmatrix}$$

Then, the parity check matrix H is:

$$H = \begin{bmatrix} 1 & 0 & 0 & 0 & 0 & 0 & 0 & 1 & 1 & 0 & 0 & 0 & 0 & 0 & 0 \\ 0 & 1 & 0 & 0 & 1 & 0 & 0 & 0 & 0 & 1 & 0 & 0 & 0 & 0 & 0 \\ 0 & 0 & 0 & 1 & 0 & 0 & 1 & 0 & 0 & 0 & 1 & 0 & 0 & 0 & 0 \\ 0 & 0 & 0 & 1 & 0 & 0 & 1 & 0 & 0 & 0 & 0 & 1 & 0 & 0 & 0 \\ 0 & 0 & 1 & 0 & 0 & 0 & 0 & 1 & 0 & 0 & 1 & 0 & 0 & 0 & 1 \\ 0 & 0 & 0 & 1 & 1 & 0 & 0 & 0 & 0 & 0 & 1 & 1 & 0 & 0 & 0 \\ 1 & 0 & 0 & 0 & 0 & 1 & 0 & 0 & 1 & 0 & 0 & 0 & 0 & 1 & 0 & 0 \\ 0 & 1 & 0 & 0 & 0 & 0 & 1 & 0 & 0 & 1 & 0 & 0 & 0 & 0 & 1 & 0 \end{bmatrix}$$

The corresponding base graph matrix is as follows:

$$BG = \begin{bmatrix} 1 & 1 & 1 & 0 \\ 1 & 1 & 1 & 1 \end{bmatrix}$$

The LDPC code is a system code, i.e., an information sequence C and a parity sequence W form an LDPC code word [C, W]. The LDPC code information sequence C is already determined and known, and the process of LDPC coding is a process of finding the parity sequence W.

The LDPC coding process of a mb×nb base matrix is as follows.

Firstly, an LDPC code parity check matrix H is obtained by replacing in the base matrix, a corresponding position of an element indicating an all-zero square matrix with the all-zero square matrix, and a position of an element indicating a cyclic shift of an identity matrix with a cyclic shift matrix of the identity matrix, where a dimension number of the all-zero square matrix or the identity matrix is equal to the lifting size z.

Secondly, the LDPC code parity check matrix H may also be divided into 2 parts: a system block Hc and a parity block Hw, where H=[Hc, Hw], i.e., Hc consists of the first kb×z columns in the parity check matrix H (with a dimension number of mb×z rows and kb×z columns), and Hw consists of the last mb×z columns in the parity check matrix H (with a dimension number of mb×z rows and mb×z columns), kb=nb−mb. The LDPC code word satisfies the following equation:

$$H \times [C, W]^T = [Hc, Hw] \times [C, W]^T = 0.$$

Further, $$Hw \times W^T = Hc \times C^T.$$

Finally, the LDPC code parity sequence W may be calculated by the following equation, so as to complete the LDPC coding:

$$W^T = Hw^{-1} \cdot Hc \cdot C^T.$$

After the LDPC code word [C, W] is obtained, bit selection (or rate matching) may be performed from the LDPC code word [C, W] according to a desired coding rate, so as to output a transmission bit sequence with a corresponding length. Since the LDPC code itself has a parallel characteristic, the LDPC coding or LDPC decoding may use parallel coding or decoding, which has a higher encoding or decoding throughput.

Accordingly, the embodiments of the present disclosure provide an LDPC data processing method for LDPC coding and LDPC decoding, which may not only improve the error floor performance of the LDPC code, but also improve the decoding speed of the LDPC code.

In an embodiment, FIG. 1 is a flowchart of a coding method provided by the embodiments of the present disclosure. This embodiment is applied to a first transmission node, or a communication device. Herein, the first transmission node or the communication device includes at least one of the following devices: a mobile device, an access terminal, a user terminal, a user station, a user unit, a mobile station, a remote station, a remote terminal, a user agent, a user apparatus, a user equipment, or some other terms, etc. In addition, the first transmission node or the communication device may also include at least one of the following devices: a base station (BS), an access point (AP), or may be referred to as a node B, a g node B (generalized node B), a radio network controller (RNC), an evolved Node B (eNB), a base station controller (BSC), a base transceiver station (BTS), a transceiver function (TF), a radio router, a radio transceiver, a basic service set (BSS), an extended service set (ESS), a radio base station (RBS), or some other terms, etc.

Herein, the first transmission node or the communication device may be a coding end. As shown in FIG. 1, this embodiment includes S110-S130:

S110, determining a base matrix for LDPC coding from a preset base matrix set.

S120, performing LDPC coding on original data according to the base matrix, so as to obtain coded data.

S130, transmitting the coded data to a second transmission node.

Herein, the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate.

In an embodiment, the coding end determines the base matrix of the LDPC coding from the preset base matrix set, and performs LDPC coding on the original data according to the base matrix to obtain the coded data, and transmits the coded data to the second transmission node, and by containing an element indicating an all-zero square matrix or an element indicating a cyclic shift of an identity matrix, and using the same coding rate for LDPC coding, thus the error floor performance of the LDPC code is improved, and the LDPC decoding speed is improved.

In an embodiment, the each subset includes at least one of: a base matrix in a first type of base matrix; a base matrix in a second type of base matrix;
  where a sub-matrix consisting of last M columns in a base graph matrix of a base matrix in the first type of base matrix has a bi-diagonal structure, where M is a number of rows of the base matrix in the first type of base matrix and is a positive integer;
  a sub-matrix consisting of last P columns in a base graph matrix of a base matrix in the second type of base matrix has a single-diagonal structure, where P is an integer greater than 2.

In an embodiment, a feature of the first type of base matrix is as follows: the sub-matrix consisting of last M columns in the base graph matrix has a bi-diagonal structure; a feature of the sub-matrix having the bi-diagonal structure is as follows: a matrix obtained by cyclic shifting of a first identity matrix is added to another identity matrix, and the maximum column weight in the sub-matrix is an odd number greater than 2. In an embodiment, a feature of the second type of base matrix is as follows: the sub-matrix consisting of last P columns in the base graph matrix has a single-diagonal structure; and a feature of the sub-matrix having a single-diagonal structure is as follows: the sub-matrix consisting of the first M−P rows is an all-zero matrix, and the sub-matrix consisting of the last P rows is an identity matrix. Herein, P and M are positive integers, and P is greater than 2, M is a number of rows of the base graph matrix, and M is an integer greater than P+2. Exemplarily, M is equal to P+4, P+5, P+6, or P+7.

In an embodiment, there is only the first type of base matrix in a subset of base matrices with the coding rate being greater than or equal to a first coding rate threshold; there is at least one subset of base matrices with the coding rate being less than the first coding rate threshold, and there is no first type of base matrix in a subset of base matrices with the coding rate being less than the first coding rate threshold; where the first coding rate threshold is a positive real number less than 1.

In an embodiment, there is only the first type of base matrix in a subset of base matrices with the coding rate being greater than or equal to a first coding rate threshold; there is only the second type of base matrix in a subset of base matrices with the coding rate being less than a first coding rate threshold; where the first coding rate threshold is a positive real number less than 1.

In an embodiment, there is only the second type of base matrix in a subset of base matrices with the coding rate being less than or equal to a second coding rate threshold; there is at least one subset of base matrices with the coding rate being greater than the second coding rate threshold, and there is no second type of base matrix in a subset of base matrices with the coding rate being greater than the second coding rate threshold; where the second coding rate threshold is a positive real number less than 1.

In an embodiment, there are both the first type of base matrix and the second type of base matrix in a subset of base matrices with the coding rate being greater than or equal to a third coding rate threshold; where the third coding rate threshold is a positive real number less than 1.

In an embodiment, there are both the first type of base matrix and the second type of base matrix in a subset of base matrices with the coding rate being less than or equal to a fourth coding rate threshold; where the fourth coding rate threshold is a positive real number less than 1.

In an embodiment, there are both the first type of base matrix and the second type of base matrix in a subset of base matrices with the coding rate being less than or equal to a fifth coding rate threshold and greater than a sixth coding rate threshold; where the sixth coding rate threshold is less than the fifth coding rate threshold, the fifth coding rate threshold is a positive real number less than $8/9$, and the sixth coding rate threshold is greater than $1/3$.

In an embodiment, there is the first type of base matrix in a subset of base matrices with the coding rate being greater than or equal to a seventh coding rate threshold; there are both the first type of base matrix and the second type of base matrix in a subset of base matrices with the coding rate being less than the seventh coding rate threshold; where the seventh coding rate threshold is a positive real number less than 1.

In an embodiment, there is only the first type of base matrix in a subset of base matrices with the coding rate being greater than or equal to a seventh coding rate threshold; there are both the first type of base matrix and the second type of base matrix in any subset of base matrices with the coding rate being less than the seventh coding rate threshold.

In an embodiment, there are both the first type of base matrix and the second type of base matrix in a subset of base matrices with the coding rate being greater than or equal to an eighth coding rate threshold; there is the second type of base matrix in a subset of base matrices with the coding rate being less than the eighth coding rate threshold; where the eighth coding rate threshold is a positive real number less than 1.

In an embodiment, there are both the first type of base matrix and the second type of base matrix in a subset of base matrices with the coding rate being greater than or equal to an eighth coding rate threshold; there is only the second type of base matrix in a subset of base matrices with the coding rate being less than the eighth coding rate threshold.

In an embodiment, there is the first type of base matrix in a subset of base matrices with the coding rate being greater than or equal to a ninth coding rate threshold; where there are both the first type of base matrix and the second type of base matrix in a subset of base matrices with the coding rate being less than the ninth coding rate threshold and greater than or equal to a tenth coding rate threshold; there is the second type of base matrix in a subset of base matrices with the coding rate being less than the tenth coding rate threshold; where the ninth coding rate threshold is greater than the tenth coding rate threshold, and the ninth coding rate threshold and the tenth coding rate threshold are a positive real number less than 1, respectively.

In an embodiment, there is only the first type of base matrix in a subset of base matrices with the coding rate being greater than or equal to a ninth coding rate threshold; where there are both the first type of base matrix and the second type of base matrix in a subset of base matrices with the coding rate being less than the ninth coding rate threshold and greater than or equal to a tenth coding rate threshold; there is the second type of base matrix in a subset of base matrices with the coding rate being less than the tenth coding rate threshold.

In an embodiment, there is only the first type of base matrix in a subset of base matrices with the coding rate being greater than or equal to an eleventh coding rate threshold; there is only the second type of base matrix in a subset of base matrices with the coding rate being less than or equal to a twelfth coding rate threshold; where the eleventh coding rate threshold and the twelfth coding rate threshold are both positive real numbers less than 1. In an embodiment, the eleventh coding rate threshold is greater than the twelfth coding rate threshold.

In an embodiment, there is at least one subset of base matrices in the base matrix set and including both the first type of base matrix and the second type of base matrix.

In an embodiment, there is at least one subset of base matrices of a first coding rate in the base matrix set and including both the first type of base matrix and the second type of base matrix; there is at least one subset of base matrices with a coding rate being a second coding rate, and including only the first type of base matrix; where the first coding rate is less than the second coding rate.

In an embodiment, in the base matrix set, there is at least one subset of base matrices with a third coding rate, and including both the first type of base matrix and the second type of base matrix; there is at least one subset of base matrices with a fourth coding rate, and including only the second type of base matrix; where the third coding rate is greater than the fourth coding rate.

In an embodiment, in the base matrix set, there is at least one subset of base matrices with a fifth coding rate, and including only the first type of base matrix; and there is at least one subset of base matrices with a sixth coding rate, and including only the second type of base matrix; where the fifth coding rate is greater than the sixth coding rate.

In an embodiment, in the base matrix set, there is at least one subset of base matrices with a coding rate, including both the first type of base matrix and the second type of base matrix, the coding rate includes one of: $3/4$, $2/3$, $5/8$, $3/5$, $1/2$, $2/5$.

In an embodiment, in the base matrix set, all subsets of base matrices corresponding to coding rates include both the first type of base matrix and the second type of base matrix.

In an embodiment, in the base matrix set, all base matrices in each subset of base matrices correspond to a same coding rate.

Figure 2:
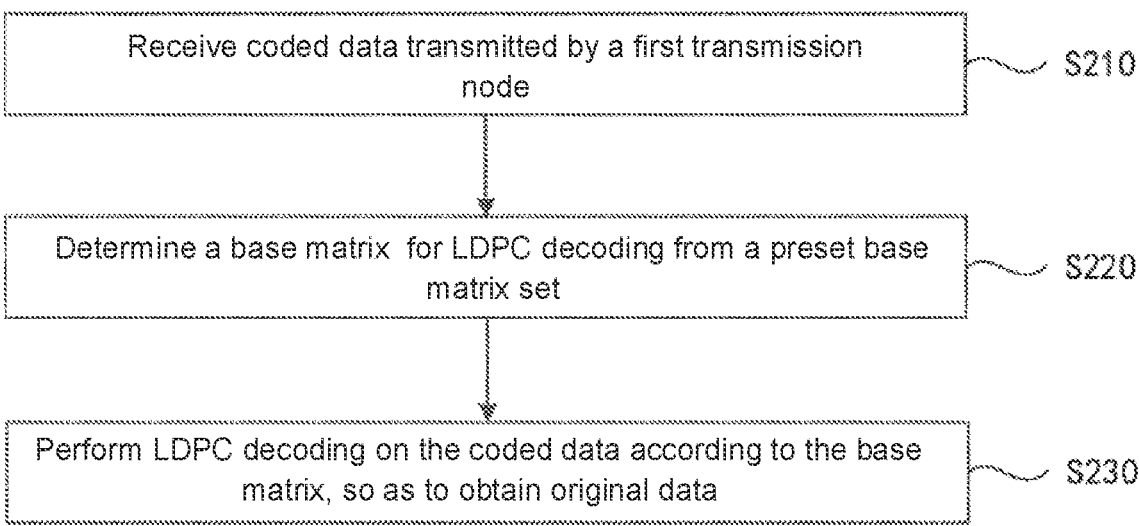
FIG. 2 is a flowchart of a decoding method provided by the embodiments of the present disclosure.

In an embodiment, FIG. 2 is a flowchart of a decoding method provided by the embodiments of the present disclosure. This embodiment may be performed by a second transmission node or a communication device. The second transmission node or the communication device includes at least one of the following devices: a mobile device, an access terminal, a user terminal, a user station, a user unit, a mobile station, a remote station, a remote terminal, a user agent, a user apparatus, a user equipment, or some other terms. In addition, the second transmission node or the communication device may also include at least one of the following devices: a base station (BS), an access point (AP), or may be referred to as a node B, a g node B (generalized node B), a radio network controller (RNC), an evolved node B (eNB), a base station controller (BSC), a base transceiver station (BTS), a transceiver function (TF), a radio router, a radio transceiver, a basic service set (BSS), an extended service set (ESS), a radio base station (RBS), or some other terms.

Herein, the second transmission node or the communication device may be a decoding end. As shown in FIG. 2, this embodiment includes: S210-S230:

S210, receiving coded data transmitted by a first transmission node.

S220, determining a base matrix for LDPC decoding from a preset base matrix set.

S230, performing LDPC decoding on the coded data according to the base matrix, so as to obtain original data.

Herein, the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate.

In an embodiment, the decoding end receives the coded data transmitted by the first transmission node, and determines the base matrix for LDPC decoding from a preset base matrix set, and performs LDPC decoding on the coded data according to the base matrix to obtain the original data, and by including the element indicating the all-zero square matrix or the element indicating the cyclic shift of the identity matrix, and performing LDPC decoding by adopting the same coding rate, thus the error floor performance of the LDPC code is improved, and the LDPC decoding speed is increased.

In an embodiment, the each subset includes at least one of: a base matrix in a first type of base matrix; a base matrix in a second type of base matrix;
    where a sub-matrix consisting of last M columns in a base graph matrix of a base matrix in base matrices of the first type has a bi-diagonal structure, where M is a number of rows of the base matrix in base matrices of the first type and is a positive integer;
    a sub-matrix consisting of last P columns in a base graph matrix of a base matrix in base matrices of the second type has a single-diagonal structure, where P is an integer greater than 2.

In an embodiment, there is only the first type of base matrix, in a subset of base matrices with the coding rate being greater than or equal to a first coding rate threshold; there is at least one subset of base matrices with the coding rate being less than the first coding rate threshold, and there is no first type of base matrix in a subset of base matrices with the coding rate being less than the first coding rate threshold; where the first coding rate threshold is a positive real number less than 1.

In an embodiment, there is only the first type of base matrix, in a subset of base matrices with the coding rate being greater than or equal to a first coding rate threshold; there is only the second type of base matrix, in a subset of base matrices with the coding rate being less than the first coding rate threshold; where the first coding rate threshold is a positive real number less than 1.

In an embodiment, there is only the second type of base matrix, in a subset of base matrices with the coding rate being less than or equal to a second coding rate threshold; there is at least one subset of base matrices with the coding rate being greater than the second coding rate threshold, and there is no second type of base matrix in a subset of base matrices with the coding rate being greater than the second coding rate threshold; where the second coding rate threshold is a positive real number less than 1.

In an embodiment, there are both the first type of base matrix and the second type of base matrix, in a subset of base matrices with the coding rate being greater than or equal to a third coding rate threshold; where the third coding rate threshold is a positive real number less than 1.

In an embodiment, there are both the first type of base matrix and the second type of base matrix, in a subset of base matrices with the coding rate being less than or equal to a fourth coding rate threshold; where the fourth coding rate threshold is a positive real number less than 1.

In an embodiment, there are both the first type of base matrix and the second type of base matrix, in a subset of base matrices with the coding rate being less than or equal to a fifth coding rate threshold and greater than a sixth coding rate threshold; where the sixth coding rate threshold is less than the fifth coding rate threshold, the fifth coding rate threshold is a positive real number less than 8/9, and the sixth coding rate threshold is greater than 1/3.

In an embodiment, there is the first type of base matrix, in a subset of base matrices with the coding rate being greater than or equal to a seventh coding rate threshold; there are both the first type of base matrix and the second type of base matrix, in a subset of base matrices with the coding rate being less than the seventh coding rate threshold; where the seventh coding rate threshold is a positive real number less than 1.

In an embodiment, there is only the first type of base matrix, in a subset of base matrices with the coding rate being greater than or equal to a seventh coding rate threshold; and there are both the first type of base matrix and the second type of base matrix, in any subset of base matrices with the coding rate being less than the seventh coding rate threshold.

In an embodiment, there are both the first type of base matrix and the second type of base matrix, in a subset of base matrices with the coding rate being greater than or equal to an eighth coding rate threshold; there is the second type of base matrix, in a subset of base matrices with the coding rate being less than the eighth coding rate threshold; where the eighth coding rate threshold is a positive real number less than 1.

In an embodiment, there are both the first type of base matrix and the second type of base matrix, in any subset of base matrices with the coding rate being greater than or equal to an eighth coding rate threshold; there is only the second type of base matrix, in a subset of base matrices with the coding rate being less than the eighth coding rate threshold.

In an embodiment, there is the first type of base matrix, in a subset of base matrices with the coding rate being greater than or equal to a ninth coding rate threshold; there are both the first type of base matrix and the second type of base matrix, in a subset of base matrices with the coding rate being less than the ninth coding rate threshold and greater than or equal to a tenth coding rate threshold; there is the second type of base matrix, in a subset of base matrices with the coding rate being less than the tenth coding rate threshold; where the ninth coding rate threshold is greater than the tenth coding rate threshold, and the ninth coding rate threshold and the tenth coding rate threshold are both positive real numbers less than 1.

In an embodiment, there is only the first type of base matrix, in any subset of base matrices with the coding rate being greater than or equal to the ninth coding rate threshold; there are both the first type of base matrix and the second type of base matrix, in any subset of base matrices with the coding rate being less than the ninth coding rate threshold and greater than or equal to a tenth coding rate threshold; there is only the second type of base matrix, in a subset of base matrices with the coding rate being less than the tenth coding rate threshold.

In an embodiment, there is only the first type of base matrix, in a subset of base matrices with the coding rate being greater than or equal to an eleventh coding rate threshold; there is only the second type of base matrix, in a subset of base matrices with the coding rate being less than or equal to a twelfth coding rate threshold; where the eleventh coding rate threshold and the twelfth coding rate threshold are both positive real numbers less than 1. In an embodiment, the eleventh coding rate threshold is greater than the twelfth coding rate threshold.

In an embodiment, in the base matrix set, there is at least one subset of base matrices, and including both the first type of base matrix and the second type of base matrix.

In an embodiment, in the base matrix set, there is at least one subset of base matrices with a first coding rate, and including both the first type of base matrix and the second type of base matrix; and there is at least one subset of base matrices with a second coding rate, and including only the first type of base matrix; where the first coding rate is less than the second coding rate.

In an embodiment, in the base matrix set, there is at least one subset of base matrices with a third coding rate, and including both the first type of base matrix and the second type of base matrix; there is at least one subset of base matrices with a fourth coding rate, and including only the second type of base matrix; where the third coding rate is greater than the fourth coding rate.

In an embodiment, in the base matrix set, there is at least one subset of base matrices with a fifth coding rate, and including only the first type of base matrix; and there is at least one subset of base matrices with a sixth coding rate, and including only the second type of base matrix; where the fifth coding rate is greater than the sixth coding rate.

In an embodiment, in the base matrix set, there is at least one subset of base matrices with a coding rate, and including both the first type of base matrix and the second type of base matrix, the coding rate includes one of: ¾, ⅔, ⅝, ⅗, ½, ⅖.

In an embodiment, in the base matrix set, all subsets of base matrices corresponding to coding rates include both the first type of base matrix and the second type of base matrix.

In an embodiment, in the base matrix set, all base matrices in each subset of base matrices correspond to a same coding rate.

It should be noted that, the explanation of the various parameters in the decoding method may refer to the description in the coding method in the above embodiments, which will not be repeated herein.

Figure 3:
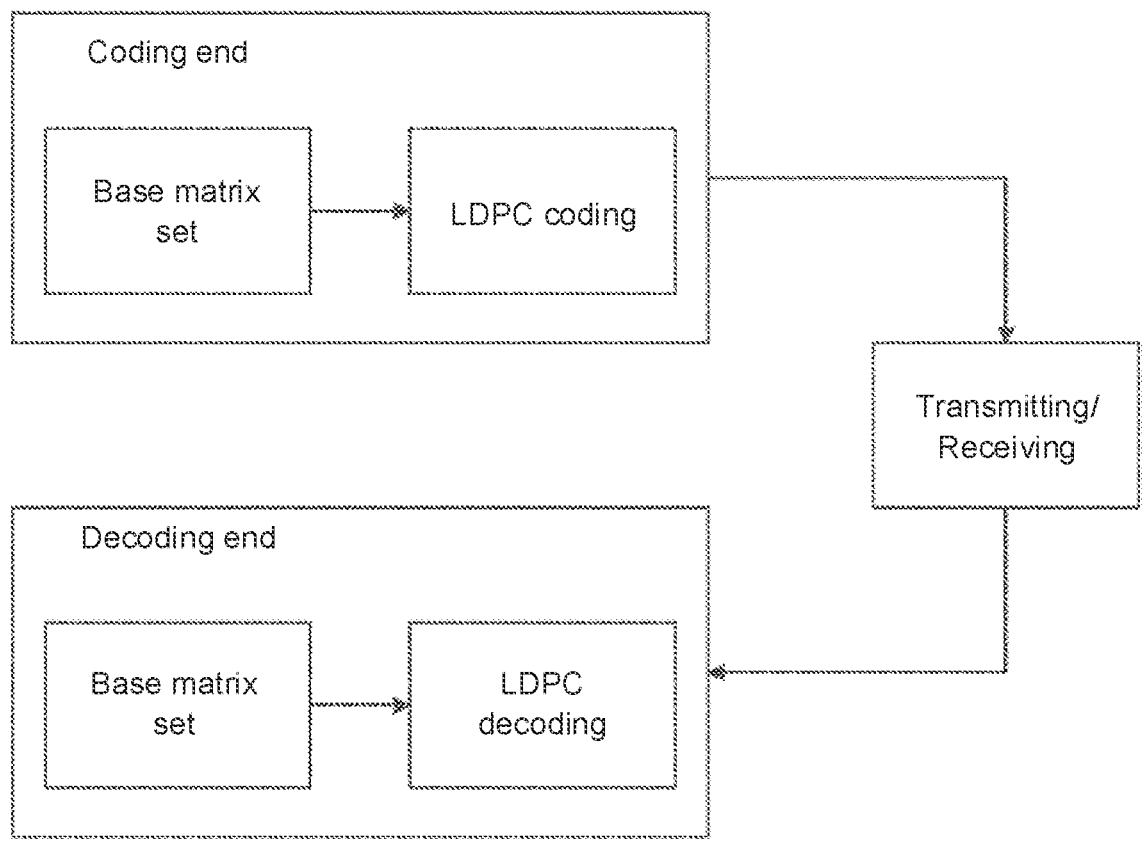
FIG. 3 is a flow schematic diagram of coding and decoding provided by the embodiments of the present disclosure.

In an embodiment, FIG. 3 is a flow schematic diagram of coding and decoding provided by the embodiments of the present disclosure. As shown in FIG. 3, a process at the coding end includes: determining a base matrix for LDPC coding from a base matrix set, and performing LDPC coding based on the base matrix; transmitting data obtained from the coding to the decoding end. The decoding end determines a base matrix for LDPC decoding from a base matrix set, and performs LDPC decoding based on the base matrix. The coding end and the decoding end may be simultaneously in a transmission node or a communication device, for receiving and decoding coded data from other transmission nodes or communication devices. The transmission node or the communication device may also contain only one of the coding end and the decoding end.

Figure 4:
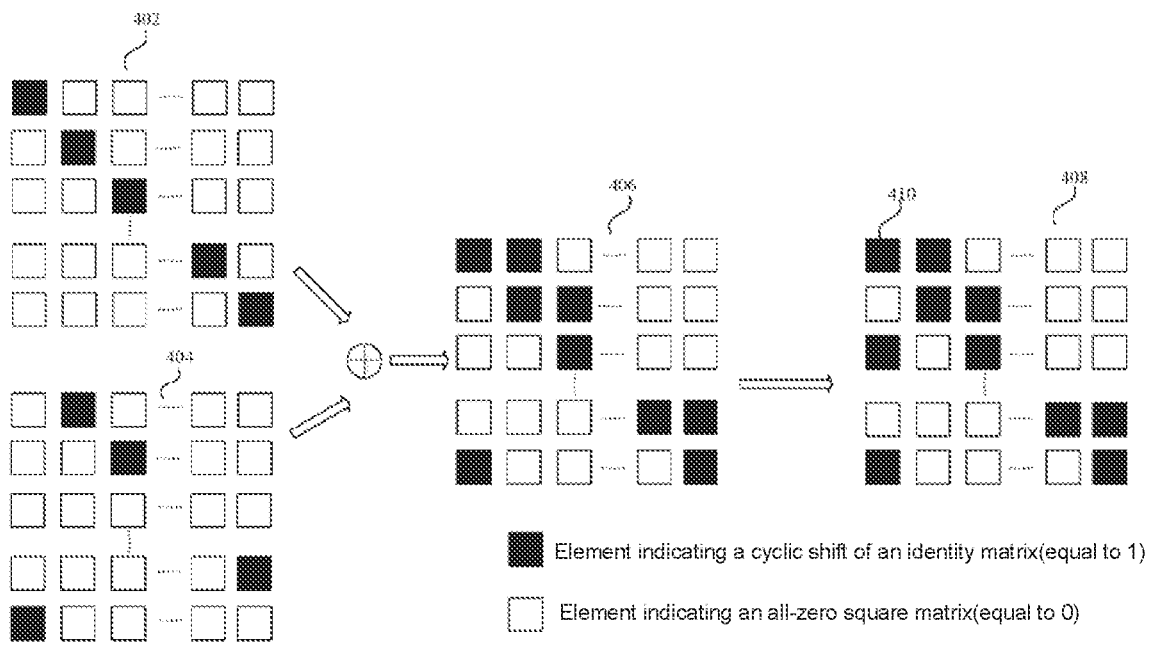
FIG. 4 is a display schematic diagram of a first type of base matrix provided by the embodiments of the present disclosure.

In an embodiment, FIG. 4 is a display schematic diagram of a sub-matrix having a bi-diagonal structure provided by the embodiments of the present disclosure. As shown in FIG. 4, a blank box is an element indicating an all-zero square matrix, i.e., corresponding to a "−1" element in the base matrix or corresponding to "0" in the base graph matrix; a black filled box is an element indicating a cyclic shift of an identity matrix, i.e., corresponding to a non-"−1" element in the base matrix or corresponding to "1" in the base graph matrix. In an embodiment, the sub-matrix having a bi-diagonal structure is as follows: a matrix (404) obtained by a right cyclic shift of an identity matrix with 1 bit is added to another identity matrix (402) to obtain a matrix (406), and a column weight of a first column (410) is changed to 3, then a final matrix (408) is a matrix having the bi-diagonal structure. Herein, a dimension number of the identity matrix is equal to M, and M is an integer greater than 3. A dimension number of the sub-matrix of the bi-diagonal structure is M rows and M columns. Exemplarily, the maximum column weight in the sub-matrix may be equal to 5, 7, 9, or 11.

For a specific example of the first type of base matrix, a base matrix (4 rows and 11 columns) shown below is the first type of base matrix, and a sub-matrix consisting of the last 4 columns of a base graph matrix (obtained by setting in the base matrix, "−1" elements to "0" and non-"−1" elements to "1") corresponding to the base matrix, is a bi-diagonal structure, where 4 is a number of rows of the base matrix.

| 3  | −1 | 2  | 61 | −1 | 19 | 50 | 0  | 0  | −1 | −1 |
|----|----|----|----|----|----|----|----|----|----|----|
| 29 | 14 | 32 | 2  | 10 | −1 | −1 | 1  | 0  | 0  | −1 |
| 2  | 4  | −1 | 36 | 20 | −1 | 13 | −1 | −1 | 0  | 0  |
| 7  | 38 | 21 | −1 | 37 | 1  | −1 | 0  | −1 | −1 | 0  |

Figure 5:
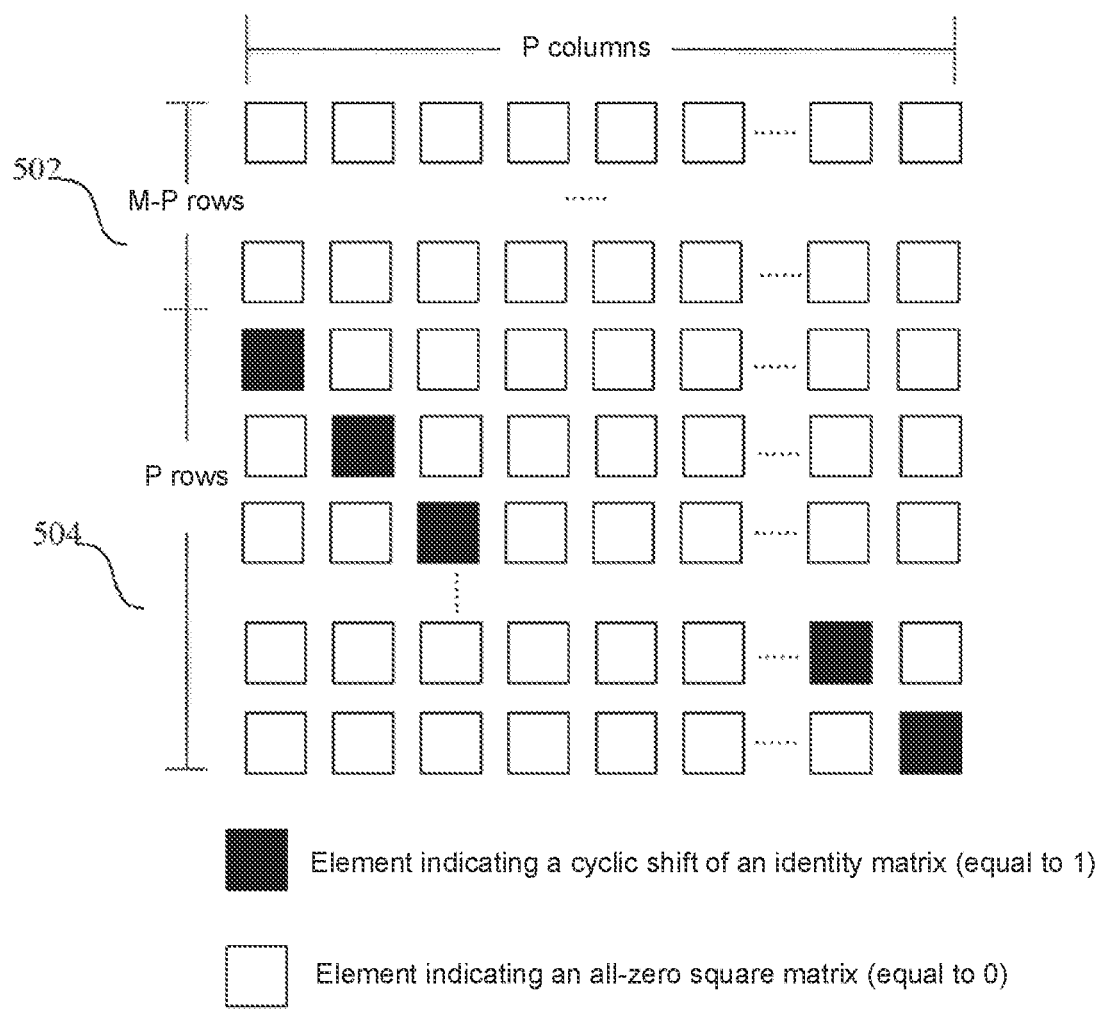
FIG. 5 is a display schematic diagram of a second type of base matrix provided by the embodiments of the present disclosure.

In an embodiment, FIG. 5 is a display schematic diagram of a sub-matrix having a single-diagonal structure provided by the embodiments of the present disclosure. As shown in FIG. 5, a blank box is an element indicating an all-zero square matrix, i.e., corresponding to a "−1" element in the base matrix or corresponding to a "0" in the base graph matrix; a black filled box is an element indicating a cyclic shift of an identity matrix, i.e., corresponding to a non-"−1" element in the base matrix or corresponding to a "1" in the base graph matrix. In an embodiment, the sub-matrix of the single-diagonal structure is as follows: a sub-matrix consisting of the first M−P rows in the sub-matrix of the single-diagonal structure is an all-zero matrix (502), and a sub-matrix consisting of the last P rows in the sub-matrix of the single-diagonal structure is an identity matrix (504), M is a number of rows of the sub-matrix of the single-diagonal structure, and P is an integer greater than 2. A dimension number of the sub-matrix of the single-diagonal structure is M rows and P columns.

For a specific example of the second type of base matrix, a base matrix (14 rows and 21 columns) shown below is a second type of base matrix, and a sub-matrix (M=14 rows and P=9 columns) consisting of the last P=9 columns (the rightmost 9 columns) of a base graph matrix (obtained from setting in the base matrix, "−1" elements to "0" and non-"−1" elements to "1") corresponding to the base matrix, is a single-diagonal structure; in the sub-matrix consisting of the last P=9 columns of the base graph matrix, a sub-matrix consisting of the first M−P=5 rows is an all-zero matrix (if corresponding to the base matrix, it is an all-"−1" matrix), and a sub-matrix consisting of the last P=9 rows is an identity matrix.

| | | | | | | | | | | | | | | | | | | | |
|---|---|---|---|---|---|---|---|---|---|---|---|---|---|---|---|---|---|---|---|
| 4 | −1 | 56 | −1 | 59 | 11 | 18 | 0 | 0 | −1 | −1 | −1 | −1 | −1 | −1 | −1 | −1 | −1 | −1 | −1 |
| 8 | 45 | 14 | 54 | −1 | 5 | 55 | −1 | 0 | 0 | −1 | −1 | −1 | −1 | −1 | −1 | −1 | −1 | −1 | −1 |
| 20 | 30 | 53 | 59 | 39 | −1 | 1 | 1 | −1 | 0 | 0 | −1 | −1 | −1 | −1 | −1 | −1 | −1 | −1 | −1 |
| −1 | 10 | −1 | 12 | 5 | 56 | −1 | −1 | −1 | −1 | 0 | 0 | −1 | −1 | −1 | −1 | −1 | −1 | −1 | −1 |
| 3 | 50 | −1 | −1 | −1 | −1 | −1 | 0 | −1 | −1 | −1 | 0 | −1 | −1 | −1 | −1 | −1 | −1 | −1 | −1 |
| 33 | 28 | −1 | −1 | −1 | −1 | 42 | −1 | −1 | −1 | −1 | −1 | 0 | −1 | −1 | −1 | −1 | −1 | −1 | −1 |
| 15 | −1 | −1 | 25 | −1 | −1 | −1 | −1 | −1 | −1 | −1 | −1 | −1 | 0 | −1 | −1 | −1 | −1 | −1 | −1 |
| 18 | 62 | −1 | −1 | 22 | −1 | −1 | −1 | −1 | −1 | −1 | −1 | −1 | −1 | 0 | −1 | −1 | −1 | −1 | −1 |
| 61 | 43 | 32 | −1 | 63 | −1 | −1 | −1 | −1 | −1 | −1 | −1 | −1 | −1 | −1 | 0 | −1 | −1 | −1 | −1 |
| 10 | 62 | −1 | −1 | −1 | −1 | 41 | −1 | −1 | −1 | −1 | −1 | −1 | −1 | −1 | −1 | 0 | −1 | −1 | −1 |
| 4 | −1 | −1 | 32 | −1 | −1 | −1 | 63 | −1 | 35 | −1 | −1 | −1 | −1 | −1 | −1 | −1 | 0 | −1 | −1 |
| 25 | 44 | −1 | −1 | −1 | −1 | −1 | −1 | −1 | −1 | 2 | −1 | −1 | −1 | −1 | −1 | −1 | −1 | 0 | −1 |
| −1 | 43 | −1 | −1 | −1 | −1 | −1 | 26 | −1 | −1 | −1 | −1 | −1 | −1 | −1 | −1 | −1 | −1 | −1 | 0 |
| −1 | 18 | −1 | 50 | −1 | −1 | −1 | −1 | 3 | 10 | −1 | −1 | −1 | −1 | −1 | −1 | −1 | −1 | −1 | 0 |

In an embodiment, a process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

In an example, the base matrix set includes 7 non-empty subsets of base matrices, and all base matrices in each subset of base matrices have a same coding rate. The coding rates corresponding to the 7 non-empty subsets respectively are 8/9, 5/6, 3/4, 2/3, 1/2, 2/5, and 1/3, respectively. The base graph matrix corresponding to each non-empty subset of base matrices is described as follows respectively: "0" in the base graph matrix indicates that a corresponding index position is an all-zero square matrix, and "1" indicates that a corresponding index position is a cyclic shift of an identity matrix.

Exemplarily, a subset of base matrices corresponding to the coding rate=8/9 contains only 1 base graph matrix (i.e., a base graph matrix 1), as follows.

The base graph matrix 1 is a bi-diagonal structure (the corresponding base matrix is a first type of base matrix):

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| 1 | 0 | 0 | 0 | 0 | 0 | 1 | 1 | 1 | 1 | 1 | 1 | 0 | 0 | 0 | 0 | 1 | 1 | 1 | 1 | 1 | 0 | 1 | 1 | 1 | 1 | 0 | 0 | 0 |
| 1 | 1 | 0 | 1 | 1 | 1 | 0 | 0 | 0 | 1 | 1 | 1 | 0 | 1 | 1 | 1 | 0 | 0 | 0 | 1 | 1 | 1 | 0 | 0 | 0 | 1 | 1 | 0 | 0 |
| 1 | 1 | 1 | 0 | 1 | 1 | 0 | 1 | 1 | 0 | 0 | 1 | 1 | 0 | 1 | 1 | 0 | 1 | 1 | 0 | 0 | 0 | 0 | 1 | 0 | 1 | 1 | 0 |
| 1 | 1 | 1 | 1 | 0 | 1 | 0 | 1 | 0 | 1 | 0 | 1 | 1 | 0 | 1 | 0 | 1 | 0 | 1 | 0 | 1 | 1 | 0 | 0 | 0 | 1 | 1 |
| 1 | 1 | 1 | 1 | 1 | 0 | 1 | 1 | 0 | 1 | 0 | 0 | 1 | 1 | 1 | 0 | 1 | 1 | 0 | 1 | 0 | 1 | 0 | 1 | 1 | 0 | 0 | 0 | 1 |

Exemplarily, the subset of base matrices corresponding to the coding rate=5/6 contains 1 base graph matrix (i.e., a base graph matrix 2), as follows.

The base graph matrix 2 is a bi-diagonal structure (the corresponding base matrix is a first type of base matrix):

| | | | | | | | | | | | | | | | | | | | | | | | | |
|---|---|---|---|---|---|---|---|---|---|---|---|---|---|---|---|---|---|---|---|---|---|---|---|---|
| 1 | 0 | 1 | 1 | 0 | 1 | 1 | 0 | 1 | 1 | 1 | 1 | 0 | 1 | 1 | 1 | 1 | 1 | 0 | 1 | 1 | 0 | 0 | 0 | 0 |
| 1 | 1 | 0 | 0 | 1 | 0 | 0 | 1 | 1 | 0 | 0 | 0 | 0 | 0 | 0 | 0 | 0 | 0 | 1 | 0 | 1 | 1 | 0 | 0 | 0 |
| 1 | 0 | 0 | 1 | 0 | 1 | 0 | 0 | 1 | 1 | 1 | 1 | 1 | 0 | 1 | 1 | 1 | 1 | 0 | 1 | 0 | 1 | 1 | 0 | 0 |
| 0 | 1 | 0 | 0 | 0 | 1 | 0 | 1 | 0 | 0 | 0 | 0 | 0 | 1 | 0 | 0 | 0 | 0 | 1 | 0 | 0 | 0 | 1 | 1 | 0 |
| 1 | 1 | 1 | 1 | 0 | 1 | 1 | 0 | 1 | 0 | 1 | 1 | 1 | 0 | 1 | 1 | 1 | 1 | 0 | 0 | 0 | 0 | 0 | 1 | 1 |
| 0 | 1 | 1 | 0 | 1 | 0 | 0 | 1 | 0 | 1 | 0 | 0 | 1 | 0 | 1 | 0 | 0 | 0 | 0 | 1 | 1 | 0 | 0 | 0 | 1 |

Exemplarily, the subset of base matrices corresponding to the coding rate=3/4 contains 1 base graph matrix (a base graph matrix 3), as follows.

The base graph matrix 3 is a bi-diagonal structure (the corresponding base matrix is a first type of base matrix):

| | | | | | | | | | | | | | | | | | | | | | | | | |
|---|---|---|---|---|---|---|---|---|---|---|---|---|---|---|---|---|---|---|---|---|---|---|---|---|
| 1 | 0 | 0 | 1 | 0 | 1 | 1 | 0 | 0 | 0 | 1 | 1 | 0 | 0 | 0 | 1 | 0 | 1 | 1 | 1 | 0 | 0 | 0 | 0 | 0 |
| 0 | 1 | 0 | 1 | 1 | 1 | 0 | 1 | 0 | 1 | 1 | 0 | 1 | 0 | 0 | 0 | 1 | 1 | 0 | 1 | 1 | 0 | 0 | 0 | 0 |
| 1 | 1 | 0 | 0 | 0 | 0 | 0 | 0 | 0 | 0 | 1 | 0 | 0 | 1 | 0 | 0 | 0 | 0 | 1 | 1 | 0 | 0 | 0 | 0 | 0 |
| 0 | 1 | 1 | 0 | 0 | 0 | 0 | 1 | 1 | 1 | 0 | 1 | 1 | 0 | 0 | 1 | 0 | 1 | 0 | 0 | 1 | 1 | 0 | 0 | 0 |
| 1 | 1 | 1 | 1 | 1 | 1 | 1 | 0 | 1 | 0 | 1 | 1 | 0 | 0 | 0 | 1 | 0 | 0 | 0 | 0 | 1 | 1 | 0 | 0 | 0 |
| 1 | 0 | 0 | 0 | 0 | 0 | 0 | 1 | 0 | 0 | 0 | 0 | 0 | 1 | 1 | 1 | 0 | 0 | 0 | 0 | 0 | 1 | 1 | 0 | 0 |
| 0 | 1 | 0 | 0 | 0 | 0 | 0 | 0 | 0 | 0 | 0 | 0 | 1 | 1 | 1 | 0 | 0 | 0 | 0 | 0 | 0 | 0 | 1 | 1 | 1 |
| 1 | 0 | 1 | 0 | 1 | 0 | 1 | 0 | 1 | 0 | 0 | 0 | 0 | 0 | 1 | 1 | 0 | 0 | 1 | 0 | 0 | 0 | 0 | 0 | 1 |

Exemplarily, the subset of base matrices corresponding to the coding rate=⅔ contains 2 base graph matrices (a base graph matrix 4 and a base graph matrix 5) as follows.

The base graph matrix 4 is a bi-diagonal structure (the corresponding base matrix is a first type of base matrix):

| 1 | 0 | 0 | 0 | 0 | 0 | 0 | 1 | 0 | 1 | 0 | 1 | 0 | 1 | 1 | 1 | 1 | 0 | 0 | 0 | 0 | 0 | 0 | 0 |
|---|---|---|---|---|---|---|---|---|---|---|---|---|---|---|---|---|---|---|---|---|---|---|---|
| 0 | 1 | 0 | 1 | 1 | 1 | 1 | 0 | 0 | 0 | 1 | 0 | 0 | 0 | 0 | 0 | 0 | 1 | 1 | 0 | 0 | 0 | 0 | 0 |
| 1 | 0 | 0 | 0 | 1 | 0 | 0 | 1 | 1 | 0 | 0 | 1 | 0 | 1 | 1 | 0 | 0 | 0 | 1 | 1 | 0 | 0 | 0 | 0 |
| 0 | 1 | 0 | 1 | 0 | 1 | 0 | 0 | 0 | 1 | 0 | 1 | 0 | 1 | 1 | 0 | 0 | 0 | 0 | 1 | 1 | 0 | 0 | 0 |
| 1 | 1 | 0 | 0 | 0 | 0 | 0 | 0 | 1 | 0 | 0 | 0 | 0 | 1 | 1 | 0 | 0 | 0 | 1 | 1 | 0 | 0 | 0 | 0 |
| 1 | 0 | 0 | 1 | 0 | 0 | 1 | 0 | 0 | 0 | 0 | 0 | 0 | 0 | 0 | 0 | 0 | 0 | 0 | 1 | 1 | 0 | 0 | 0 |
| 1 | 1 | 0 | 0 | 0 | 1 | 1 | 0 | 0 | 0 | 0 | 1 | 0 | 0 | 0 | 0 | 0 | 0 | 0 | 0 | 1 | 1 | 0 | 0 |
| 0 | 1 | 0 | 0 | 0 | 0 | 0 | 0 | 0 | 0 | 0 | 0 | 1 | 0 | 0 | 0 | 0 | 0 | 0 | 0 | 0 | 1 | 1 | 0 |
| 1 | 0 | 1 | 0 | 0 | 0 | 0 | 0 | 1 | 0 | 0 | 1 | 0 | 0 | 0 | 0 | 0 | 0 | 0 | 0 | 0 | 0 | 1 | 1 |
| 1 | 1 | 1 | 0 | 1 | 1 | 0 | 1 | 1 | 0 | 1 | 1 | 0 | 0 | 1 | 1 | 0 | 0 | 0 | 0 | 0 | 0 | 0 | 1 |

The base graph matrix 5 is a bi-diagonal structure (the corresponding base matrix is a first type of base matrix):

| 1 | 0 | 1 | 0 | 0 | 0 | 0 | 1 | 0 | 1 | 0 | 1 | 0 | 1 | 1 | 1 | 1 | 0 | 0 | 0 | 0 | 0 | 0 | 0 |
|---|---|---|---|---|---|---|---|---|---|---|---|---|---|---|---|---|---|---|---|---|---|---|---|
| 0 | 1 | 0 | 1 | 1 | 1 | 1 | 0 | 0 | 0 | 1 | 0 | 0 | 0 | 0 | 0 | 1 | 1 | 0 | 0 | 0 | 0 | 0 | 0 |
| 1 | 0 | 0 | 0 | 1 | 0 | 0 | 1 | 1 | 0 | 0 | 1 | 0 | 1 | 1 | 0 | 0 | 1 | 1 | 0 | 0 | 0 | 0 | 0 |
| 0 | 1 | 0 | 1 | 0 | 1 | 0 | 0 | 0 | 1 | 0 | 1 | 0 | 1 | 1 | 0 | 0 | 0 | 1 | 1 | 0 | 0 | 0 | 0 |
| 1 | 1 | 0 | 0 | 0 | 0 | 0 | 0 | 1 | 0 | 0 | 0 | 0 | 1 | 1 | 0 | 0 | 0 | 1 | 1 | 0 | 0 | 0 | 0 |
| 0 | 1 | 0 | 1 | 0 | 0 | 1 | 0 | 0 | 0 | 0 | 0 | 0 | 0 | 0 | 0 | 0 | 0 | 0 | 1 | 1 | 0 | 0 | 0 |
| 1 | 1 | 0 | 0 | 1 | 1 | 1 | 0 | 0 | 0 | 0 | 1 | 0 | 0 | 0 | 0 | 0 | 0 | 0 | 0 | 1 | 1 | 0 | 0 |
| 1 | 0 | 0 | 0 | 0 | 0 | 0 | 0 | 0 | 0 | 0 | 0 | 1 | 0 | 0 | 0 | 0 | 0 | 0 | 0 | 0 | 1 | 1 | 0 |
| 1 | 1 | 1 | 0 | 0 | 0 | 0 | 0 | 1 | 0 | 0 | 1 | 0 | 0 | 0 | 0 | 0 | 0 | 0 | 0 | 0 | 0 | 1 | 1 |
| 1 | 1 | 1 | 0 | 1 | 1 | 0 | 1 | 1 | 0 | 1 | 1 | 0 | 0 | 1 | 1 | 1 | 0 | 0 | 0 | 0 | 0 | 0 | 1 |

Exemplarily, the subset of base matrices corresponding to the coding rate=½ contains 2 base graph matrices (i.e., a base graph matrix 6 and a base graph matrix 7), as follows.

The base graph matrix 6 is a bi-diagonal structure (the corresponding base matrix is a first type of base matrix):

| 1 | 1 | 0 | 0 | 0 | 0 | 1 | 0 | 0 | 0 | 1 | 1 | 1 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|
| 1 | 0 | 0 | 0 | 1 | 0 | 0 | 0 | 0 | 0 | 0 | 0 | 1 | 1 | 0 | 0 | 0 | 0 | 0 | 0 | 0 | 0 | 0 | 0 |
| 1 | 1 | 0 | 1 | 1 | 0 | 1 | 0 | 0 | 1 | 0 | 0 | 0 | 1 | 1 | 0 | 0 | 0 | 0 | 0 | 0 | 0 | 0 | 0 |
| 0 | 1 | 1 | 0 | 1 | 0 | 0 | 0 | 1 | 0 | 0 | 0 | 1 | 0 | 1 | 1 | 0 | 0 | 0 | 0 | 0 | 0 | 0 | 0 |
| 1 | 1 | 0 | 0 | 1 | 0 | 0 | 0 | 0 | 0 | 0 | 0 | 0 | 0 | 1 | 1 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 1 | 1 | 0 | 0 | 0 | 0 | 0 | 0 | 0 |
| 1 | 0 | 1 | 0 | 1 | 0 | 0 | 0 | 0 | 1 | 0 | 1 | 0 | 0 | 0 | 1 | 1 | 0 | 0 | 0 | 0 | 0 | 0 | 0 |
| 1 | 1 | 0 | 0 | 1 | 0 | 0 | 0 | 0 | 0 | 0 | 0 | 0 | 0 | 0 | 0 | 1 | 1 | 0 | 0 | 0 | 0 | 0 | 0 |
| 1 | 1 | 0 | 0 | 1 | 1 | 0 | 0 | 0 | 0 | 0 | 0 | 0 | 0 | 0 | 0 | 1 | 1 | 0 | 0 | 0 | 0 | 0 | 0 |
| 0 | 1 | 0 | 1 | 0 | 1 | 1 | 1 | 0 | 0 | 1 | 0 | 0 | 0 | 0 | 0 | 0 | 1 | 1 | 0 | 0 | 0 | 0 | 0 |
| 1 | 0 | 1 | 1 | 0 | 1 | 1 | 0 | 0 | 1 | 0 | 0 | 0 | 0 | 0 | 0 | 0 | 0 | 1 | 1 | 0 | 0 | 0 | 0 |
| 1 | 0 | 0 | 0 | 1 | 1 | 1 | 0 | 0 | 1 | 0 | 1 | 0 | 0 | 0 | 0 | 0 | 0 | 0 | 1 | 1 | 0 | 0 | 0 |
| 1 | 1 | 0 | 0 | 1 | 1 | 0 | 0 | 1 | 1 | 1 | 0 | 0 | 0 | 0 | 0 | 0 | 0 | 0 | 0 | 1 | 1 | 0 | 0 |
| 0 | 1 | 0 | 0 | 1 | 0 | 0 | 0 | 1 | 0 | 0 | 0 | 1 | 0 | 0 | 0 | 0 | 0 | 0 | 0 | 0 | 0 | 0 | 1 |

The base graph matrix 7 is a single-diagonal structure (the corresponding base matrix is a second type of base matrix):

| 1 | 0 | 1 | 0 | 1 | 1 | 0 | 1 | 1 | 1 | 0 | 1 | 1 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|
| 1 | 1 | 1 | 1 | 0 | 1 | 1 | 0 | 1 | 1 | 1 | 0 | 0 | 0 | 0 | 0 | 0 | 0 | 0 | 0 | 0 | 0 | 0 | 0 |
| 1 | 1 | 1 | 1 | 1 | 0 | 1 | 1 | 0 | 1 | 0 | 0 | 1 | 1 | 0 | 0 | 0 | 0 | 0 | 0 | 0 | 0 | 0 | 0 |
| 0 | 1 | 0 | 1 | 1 | 0 | 1 | 1 | 1 | 0 | 1 | 1 | 0 | 1 | 0 | 0 | 0 | 0 | 0 | 0 | 0 | 0 | 0 | 0 |
| 1 | 0 | 0 | 0 | 0 | 0 | 0 | 1 | 0 | 0 | 1 | 0 | 0 | 0 | 1 | 0 | 0 | 0 | 0 | 0 | 0 | 0 | 0 | 0 |
| 1 | 1 | 0 | 0 | 0 | 0 | 1 | 0 | 0 | 0 | 1 | 0 | 0 | 0 | 0 | 1 | 0 | 0 | 0 | 0 | 0 | 0 | 0 | 0 |
| 1 | 0 | 0 | 1 | 0 | 0 | 0 | 1 | 0 | 1 | 0 | 0 | 0 | 0 | 0 | 0 | 1 | 0 | 0 | 0 | 0 | 0 | 0 | 0 |
| 1 | 1 | 0 | 0 | 1 | 0 | 0 | 0 | 1 | 0 | 1 | 0 | 0 | 0 | 0 | 0 | 0 | 1 | 0 | 0 | 0 | 0 | 0 | 0 |
| 0 | 1 | 1 | 0 | 1 | 0 | 0 | 0 | 0 | 0 | 0 | 0 | 0 | 0 | 0 | 0 | 0 | 0 | 1 | 0 | 0 | 0 | 0 | 0 |
| 1 | 1 | 0 | 0 | 0 | 0 | 1 | 1 | 0 | 0 | 0 | 1 | 0 | 0 | 0 | 0 | 0 | 0 | 0 | 1 | 0 | 0 | 0 | 0 |
| 1 | 0 | 0 | 1 | 0 | 0 | 0 | 1 | 0 | 1 | 0 | 1 | 0 | 0 | 0 | 0 | 0 | 0 | 0 | 0 | 1 | 0 | 0 | 0 |
| 1 | 1 | 0 | 0 | 0 | 0 | 0 | 1 | 0 | 1 | 0 | 0 | 0 | 0 | 0 | 0 | 0 | 0 | 0 | 0 | 0 | 1 | 0 | 0 |
| 0 | 1 | 0 | 0 | 0 | 0 | 0 | 1 | 0 | 1 | 1 | 0 | 0 | 0 | 0 | 0 | 0 | 0 | 0 | 0 | 0 | 0 | 1 | 0 |
| 0 | 1 | 0 | 1 | 0 | 0 | 0 | 0 | 0 | 1 | 0 | 1 | 1 | 0 | 0 | 0 | 0 | 0 | 0 | 0 | 0 | 0 | 0 | 1 |

Exemplarily, the subset of base matrices corresponding to the coding rate=2/5 contains 1 base graph matrix (a base graph matrix 8), as follows.

The base graph matrix 8 is a single-diagonal structure (the corresponding base matrix is a second type of base matrix):

```
1 0 1 1 1 0 1 1 1 0 1 1 1 0 0 1 1 1 0 0 0
1 1 0 1 1 1 0 1 1 1 0 1 1 1 1 0 1 1 1 0 0 0
1 1 1 0 1 1 1 0 1 1 1 0 1 1 0 1 0 0 1 1 0 0
0 1 1 1 0 1 1 1 0 1 1 1 0 1 1 0 1 0 0 1 0 0
1 0 0 0 0 0 0 0 1 1 0 0 0 0 0 0 1 0 1 0
0 1 0 0 0 1 0 0 0 0 1 0 1 0 1 0 0 0 0 1
1 0 1 0 0 0 0 0 1 0 0 0 0 0 1 0 0 0 0
0 1 1 0 1 0 0 0 0 0 1 0 0 0 0 0 0 0 0 0
1 0 0 0 0 0 1 0 0 0 0 0 0 1 0 0 1 0 0 0
0 1 1 0 0 0 0 0 0 0 0 0 1 0 1 0 0 0 0 0
1 1 0 1 0 0 0 0 0 0 0 0 0 0 1 0 0 0 0 0
1 0 0 0 0 0 0 0 0 0 1 0 1 0 1 1 0 0 0 0
1 0 1 0 0 0 1 0 1 1 0 1 0 0 0 0 0 0 0 0
0 1 1 0 0 0 0 0 0 0 0 0 0 0 1 0 1 1 0 0
1 0 0 0 0 0 0 0 1 0 1 0 0 1 0 0 1 0 0
0 1 1 0 1 0 0 0 0 1 0 0 0 1 0 0 0 0 0 0
1 1 0 0 1 0 0 0 0 1 0 0 0 1 0 0 0 0 0 0
0 1 0 0 0 0 1 0 0 0 0 1 1 0 0 0 0 0 0 0
1 0 0 0 1 0 0 0 0 0 0 0 0 0 1 0 0 1 0 0
0 1 0 0 0 1 1 0 0 0 0 0 0 0 0 0 1 0 0 0
1 0 0 1 0 0 1 0 0 0 0 0 0 0 0 0 0 1 0 0
0 1 0 0 1 0 0 0 0 0 1 0 0 0 0 0 1 0 0 0
1 0 0 0 0 0 0 1 0 0 0 0 0 0 1 1 0 0 0 0
0 1 0 0 1 0 0 0 0 1 0 0 0 0 1 0 0 0 0 0
1 0 0 0 0 0 0 0 0 0 1 0 0 0 1 0 0 1 0 0
0 1 0 0 1 0 0 0 0 0 0 0 0 1 0 0 1 0 0 0 0
```

```
                            0 0 0 0 0 0 0 0 0 0 0 0 0 0 0 0
                            0 0 0 0 0 0 0 0 0 0 0 0 0 0 0 0
                            0 0 0 0 0 0 0 0 0 0 0 0 0 0 0 0
                            0 0 0 0 0 0 0 0 0 0 0 0 0 0 0 0
                            0 0 0 0 0 0 0 0 0 0 0 0 0 0 0 0
                            0 0 0 0 0 0 0 0 0 0 0 0 0 0 0 0
                            0 0 0 0 0 0 0 0 0 0 0 0 0 0 0 0
                            1 0 0 0 0 0 0 0 0 0 0 0 0 0 0 0
                            0 1 0 0 0 0 0 0 0 0 0 0 0 0 0 0
                            0 0 1 0 0 0 0 0 0 0 0 0 0 0 0 0
                            0 0 0 1 0 0 0 0 0 0 0 0 0 0 0 0
                            0 0 0 0 1 0 0 0 0 0 0 0 0 0 0 0
                            0 0 0 0 0 1 0 0 0 0 0 0 0 0 0 0
                            0 0 0 0 0 0 1 0 0 0 0 0 0 0 0 0
                            0 0 0 0 0 0 0 1 0 0 0 0 0 0 0 0
                            0 0 0 0 0 0 0 0 1 0 0 0 0 0 0 0
                            0 0 0 0 0 0 0 0 0 1 0 0 0 0 0 0
                            0 0 0 0 0 0 0 0 0 0 1 0 0 0 0 0
                            0 0 0 0 0 0 0 0 0 0 0 1 0 0 0 0
                            0 0 0 0 0 0 0 0 0 0 0 0 1 0 0 0
                            0 0 0 0 0 0 0 0 0 0 0 0 0 1 0 0
                            0 0 0 0 0 0 0 0 0 0 0 0 0 0 1 0
                            0 0 0 0 0 0 0 0 0 0 0 0 0 0 0 1
```

Exemplarily, the subset of base matrices corresponding to the coding rate=1/3 contains 1 base graph matrix (i.e., a base graph matrix 9), as follows.

The base graph matrix 9 is a single-diagonal structure (the corresponding base matrix is a second type of base matrix):

```
1 0 1 0 1 1 1 0 1 1 1 0 1 1 1 0 1 1 0 0 0 0 0 0 0
1 1 1 1 0 1 1 1 0 1 1 0 1 1 1 1 1 0 0 0 0 0 0 0
1 1 1 1 1 0 1 1 1 0 1 1 0 1 1 0 0 1 1 0 0 0 0 0 0
1 1 0 1 1 1 0 1 1 1 0 1 1 1 0 1 1 0 0 1 0 0 0 0 0
1 1 1 0 0 0 0 0 0 0 0 0 0 0 0 0 1 0 1 0 0 0 0 0 0
1 1 0 0 0 0 0 0 0 0 0 0 0 1 0 0 1 0 1 0 0 0 0 0 0
1 1 0 0 1 1 0 0 0 0 0 0 0 0 0 0 0 0 1 0 0 0 0 0
0 1 0 0 0 0 0 0 0 0 0 1 0 1 0 1 0 0 0 0 1 0 0 0
1 0 0 0 0 1 0 0 0 1 0 0 0 0 0 0 0 0 0 0 0 1 0
0 1 0 0 0 0 0 0 0 1 0 0 1 0 0 0 0 0 1 0 0 0 0 0 1
```

```
1 0 0 0 1 0 0 0 0 1 0 0 1 0 0 0 0 0 0 0 0 0 0 0 0 0
0 1 0 0 1 0 0 0 1 1 0 0 0 0 1 0 0 0 0 0 0 0 0 0 0 0
1 0 0 1 0 0 1 1 1 0 0 0 0 0 0 0 0 0 0 0 0 0 0 0 0 0
0 1 1 0 1 0 0 1 0 0 0 0 0 1 0 0 0 0 0 0 0 0 0 0 0 0
1 0 1 0 0 0 0 0 0 0 0 0 1 0 0 0 1 0 0 0 0 0 0 0 0 0
0 1 0 0 0 1 0 1 0 0 0 0 0 0 0 1 0 1 0 0 0 0 0 0 0 0
1 0 0 0 1 1 0 0 0 0 0 0 0 0 0 1 0 0 0 0 0 0 0 0 0 0
0 1 0 0 0 0 0 0 0 0 0 1 0 0 0 0 1 1 0 0 0 0 0 0 0 0
1 0 0 0 0 0 0 1 0 0 0 1 0 0 0 0 0 1 0 0 0 0 0 0 0 0
0 1 0 0 0 0 0 0 0 0 0 1 0 0 1 0 0 0 0 0 0 0 0 0 0 0
1 0 0 1 0 0 1 0 1 0 0 0 0 0 0 0 0 0 0 0 0 0 0 0 0 0
0 1 0 1 0 0 0 0 0 0 1 0 0 0 1 0 0 0 0 0 0 0 0 0 0 0
1 0 0 0 0 1 0 0 0 0 1 0 0 0 0 0 0 1 0 0 0 0 0 0 0 0
0 1 0 0 0 0 1 0 0 0 1 0 0 0 0 0 1 1 0 0 0 0 0 0 0 0
1 0 0 0 0 0 0 0 0 1 0 0 0 1 0 0 0 1 0 0 0 0 0 0 0 0
0 1 0 0 1 0 0 0 1 0 0 0 0 0 0 0 0 0 0 0 0 0 0 0 0 0
1 0 0 0 0 0 0 0 0 1 1 0 0 0 0 1 0 0 0 0 0 0 0 0 0 0
0 1 1 0 0 0 1 0 0 0 0 0 0 0 1 0 1 0 0 0 0 0 0 0 0 0
1 0 0 1 0 1 0 0 0 0 1 0 0 0 0 0 0 0 0 0 0 0 0 0 0 0
0 1 0 1 0 0 1 0 0 0 0 0 0 0 1 0 0 0 0 0 0 0 0 0 0 0
1 0 0 0 1 0 0 0 0 0 1 1 0 0 0 0 0 0 0 0 0 0 0 0 0 0
0 1 0 0 1 1 0 0 1 0 0 0 0 0 0 0 1 0 0 0 0 0 0 0 0 0
1 0 0 0 0 0 1 1 0 0 0 0 0 1 0 0 0 0 0 0 0 0 0 0 0 0
0 1 0 1 0 1 0 0 1 0 0 0 0 0 0 0 0 0 0 0 0 0 0 0 0 0
```

(continued — lower-triangular identity portion with zero prefix follows, forming an identity submatrix on the right-hand columns.)

That is, in this example, the fifth coding rate threshold is ⅔, the sixth coding rate threshold is ⅖, and the basic matrix subset in which the coding rate is less than the fifth coding rate threshold and greater than the sixth coding rate threshold includes both a first type of base matrix and a second type of base matrix.

Figure 6:
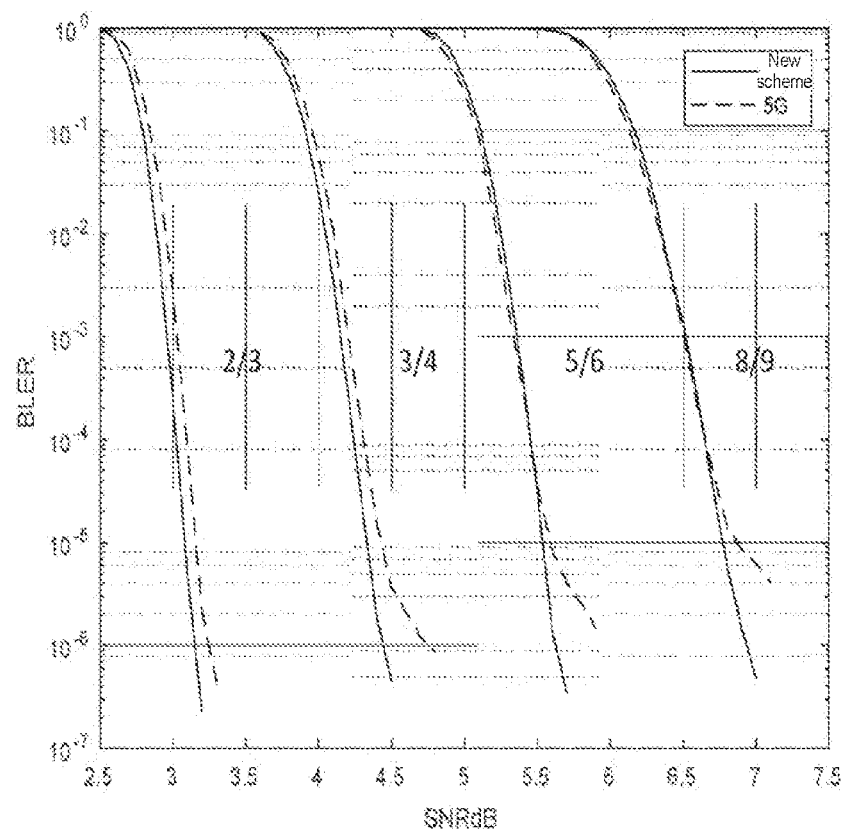
FIG. 6 is a comparative analysis diagram of an LDPC performance provided by the embodiments of the present disclosure.
Figure 7:
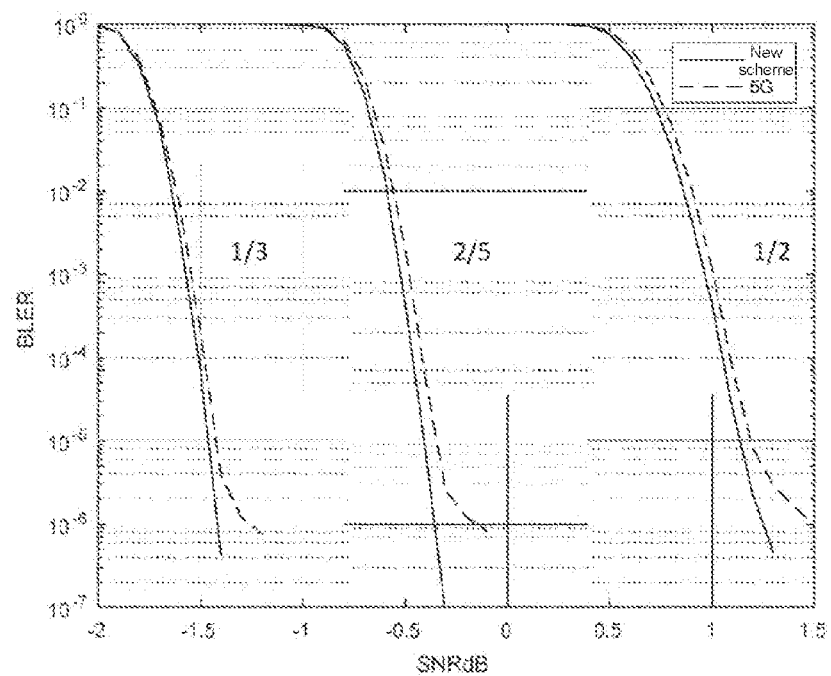
FIG. 7 is a comparative analysis diagram of another LDPC performance provided by the embodiments of the present disclosure.

FIG. 6 is a comparative analysis diagram of an LDPC performance provided by the embodiments of the present disclosure. FIG. 7 is a comparative analysis diagram of another LDPC performance provided by the embodiments of the present disclosure. As shown in FIG. 6, the performance of LDPC code using basic graph matrices with coding rates of ⅔, ¾, ⅚ and ⅝ respectively is explained. As shown in FIG. 7, the performance of LDPC code using basic graph matrices with coding rates of ⅓, ⅖ and ½ respectively is explained. The solid line represents the performance of the LDPC code achieved with this solution, and the dashed line represents the performance of the LDPC code of the 5G standard. As shown in FIG. 6 and FIG. 7, it can be seen that the performance of LDPC code of this solution is better than that of LDPC code of 5G standard, and the performance of the newly designed LDPC code shows very excellent block error rate (BLER) performance in error floor and waterfall zone performance.

In an embodiment, base matrices contained in a subset of base matrices for different comparison relationship between a coding rate and a first coding rate threshold, and different comparison relationship between a coding rate and a second coding rate threshold, are described. A process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

The base matrix set includes at least 2 non-empty subsets of base matrices, and all base matrices in each subset of base matrices have a same coding rate.

In an instance, there is only the first type of base matrix, in a subset of base matrices with the coding rate being greater than or equal to a first coding rate threshold; there is at least one subset of base matrices with the coding rate being less than the first coding rate threshold, and there is no first type of base matrix in a subset of base matrices with the coding rate being less than the first coding rate threshold; where the first coding rate threshold is a positive real number less than 1.

In an example, the first coding rate threshold is less than or equal to 5/6, and greater than or equal to 1/3.

In an example, the first coding rate threshold is equal to one of the following: 5/6, 3/4, 2/3, 3/5, 1/2, 2/5, 1/3.

In an example, the first coding rate threshold is equal to 2/3. The base matrix set includes 2 non-empty subsets of base matrices corresponding to the code rates of: 2/3, and 1/3, respectively. The base graph matrix with the code rate 2/3 is the base graph matrices 4 and 5 with the coding rate 2/3 in the above embodiments. The base graph matrix with the code rate of 1/3 is the base graph matrix 9 with the coding rate of 1/3 in the above embodiments. The first coding rate threshold may also be equal to other values, and examples will not be repeated herein.

In an instance, there is only the second type of base matrix, in a subset of base matrices with the coding rate being less than or equal to a second coding rate threshold; there is at least one subset of base matrices with the coding rate being greater than the second coding rate threshold, and there is no second type of base matrix in a subset of base matrices with the coding rate being greater than the second coding rate threshold; where the second coding rate threshold is a positive real number less than 1.

In an example, the second coding rate threshold is less than or equal to 5/6, and greater than or equal to 1/3.

In an example, the second coding rate threshold is equal to one of the following: 5/6, 3/4, 2/3, 3/5, 1/2, 2/5, 1/3.

In an example, the second coding rate threshold is equal to 2/5; in this instance, the base matrix set includes 3 non-empty subsets of base matrices corresponding to the code rates of: 5/6, 2/5, and 1/3, respectively; the base graph matrix with the code rate of 5/6 is the base graph matrix 2 with the coding rate of 5/6 in the above embodiments, the base graph matrix with the code rate of 2/5 is the base graph matrix 8 with the coding rate of 2/5 in the above embodiments, and the base graph matrix with the code rate of 1/3 is the base graph matrix 9 with the coding rate of 1/3 in the above embodiments. The second coding rate threshold may also be equal to other values, and examples will not be repeated herein.

In an instance, the first coding rate threshold is greater than the second coding rate threshold.

In an embodiment, base matrices contained in a subset of base matrices for different comparison relationship between a coding rate and a third coding rate threshold, and different comparison relationship between a coding rate and a fourth coding rate threshold, are described. A process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

The base matrix set includes at least 2 non-empty subsets of base matrices, and all base matrices in each subset of base matrices have a same coding rate.

In an instance, there are both a first type of base matrix and a second type of base matrix, in a subset of base matrices with the coding rate being greater than or equal to a third coding rate threshold; where the third coding rate threshold is a positive real number less than 1.

In an example, the third coding rate threshold is less than or equal to 5/6, and greater than or equal to 1/3.

In an example, the third coding rate threshold is equal to one of the following: 5/6, 3/4, 2/3, 3/5, 1/2, 2/5, 1/3.

In an example, the third coding rate threshold is equal to 1/2; the base matrix set includes 2 non-empty subsets of base matrices corresponding to the code rates of: 1/2, and 1/3, respectively. The base graph matrices with the code rate of 1/2 are the base graph matrices 6 and 7 with the coding rate of 1/2 in the above embodiments. The base graph matrix with the code rate of 1/3 is the base graph matrix 9 with the coding rate of 1/3 in the above embodiments. The third coding rate threshold may also be equal to other values, and examples will not be repeated herein.

In an instance, there are both a first type of base matrix and a second type of base matrix, in a subset of base matrices with the coding rate being less than or equal to a fourth coding rate threshold; where the fourth coding rate threshold is a positive real number less than 1.

In an example, the fourth coding rate threshold is less than or equal to 5/6, and greater than or equal to 1/3.

In an example, the fourth coding rate threshold is equal to one of the following: 5/6, 3/4, 2/3, 3/5, 1/2, 2/5, 1/3.

In an example, the fourth coding rate threshold is equal to 1/2; the base matrix set includes 2 non-empty subsets of base matrices corresponding to the code rates of: 1/2, and 3/4, respectively. The base graph matrices with the code rate of 1/2 are the base graph matrices 6 and 7 with the coding rate of 1/2 in the above embodiments, and the base graph matrix with the code rate of 3/4 is the base graph matrix 3 with the coding rate of 3/4 in the above embodiments. The fourth coding rate threshold may also be equal to other values, and examples will not be repeated herein.

In an embodiment, base matrices contained in a subset of base matrices for different comparison relationship between a coding rate and a fifth coding rate threshold, and different comparison relationship between a coding rate and a sixth coding rate threshold, are described. A process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

The base matrix set includes at least 2 non-empty subsets of base matrices, and all base matrices in each subset of base matrices have a same coding rate.

In an instance, there are both a first type of base matrix and a second type of base matrix, in a subset of base matrices with the coding rate being less than or equal to a fifth coding rate threshold and greater than a sixth coding rate threshold; where the sixth coding rate threshold is less than the fifth coding rate threshold, the fifth coding rate threshold is a positive real number less than 8/9, and the sixth coding rate threshold is greater than 1/3.

In an example, the fifth coding rate threshold is equal to one of the following: 5/6, 3/4, 2/3, 3/5, 1/2, 2/5. In an example, the sixth coding rate threshold is equal to one of the following: 5/6, 3/4, 2/3, 3/5, 1/2, 2/5.

In an example, the fifth coding rate threshold is equal to 1/2, and the sixth coding rate threshold is equal to 2/5; the base matrix set includes 4 non-empty subsets of base matrices corresponding to the code rates of: 5/6, 2/3, 1/2 and 2/5, respectively. The base graph matrix with the code rate of 5/6 is the base graph matrix 2 with the coding rate of 5/6 in the above embodiments, the base graph matrices with the code rate of 2/3 are the base graph matrices 4 and 5 with the coding rate of 2/3 in the above embodiments. The base graph matrices with the code rate of 1/2 are the base graph matrices 6 and 7 with the coding rate of 1/2 in the above embodiments, the base graph matrix with the code rate of 2/5 is the base graph matrix 8 with the coding rate of 2/5 in the above embodiments.

In other examples, the fifth coding rate threshold is 3/4, and the sixth coding rate threshold is 3/5; or, the fifth coding rate threshold is 3/4, and the sixth coding rate threshold is 1/2; or the fifth coding rate threshold is 2/3, and the sixth coding rate threshold is 2/5; or the fifth coding rate threshold is 5/6, and the sixth coding rate threshold is 1/2; or the fifth coding rate threshold is 3/5, and the sixth coding rate threshold is 2/5.

The fifth coding rate threshold and the sixth coding rate threshold may also be equal to other values, and examples will not be repeated herein.

In an embodiment, base matrices contained in a subset of base matrices for different comparison relationship between a coding rate and a seventh coding rate threshold are described. A process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

The base matrix set includes at least 2 non-empty subsets of base matrices, and all base matrices in each subset of base matrices have a same coding rate.

In an instance, there is a first type of base matrix, in a subset of base matrices with the coding rate being greater than or equal to a seventh coding rate threshold; there are both a first type of base matrix and a second type of base matrix, in a subset of base matrices with the coding rate being less than the seventh coding rate threshold; where the seventh coding rate threshold is a positive real number less than 1.

In an example, the seventh coding rate threshold is equal to one of the following: 5/6, 3/4, 2/3, 3/5, 1/2, 2/5.

In an example, the seventh coding rate threshold is equal to 3/4; the base matrix set includes 3 non-empty subsets of base matrices corresponding to the code rates of: 5/6, 3/4 and 1/2, respectively. The base graph matrix with the code rate of 5/6 is the base graph matrix 2 with the coding rate of 5/6 in the above embodiments, the base graph matrix with the coding rate of 3/4 is the base graph matrix 3 with the coding rate of 3/4 in the above embodiments, the base graph matrices with the coding rate of 1/2 are the base graph matrices 6 and 7 with the coding rate of 1/2 in the above embodiments. The seventh coding rate threshold may also be equal to other values, and examples will not be repeated herein.

In an embodiment, base matrices contained in a subset of base matrices for different comparison relationship between a coding rate and an eighth coding rate threshold are described. A process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

The base matrix set includes at least 2 non-empty subsets of base matrices, and all base matrices in each subset of base matrices have a same coding rate.

In an instance, there are both a first type of base matrix and a second type of base matrix, in a subset of base matrices with the coding rate being greater than or equal to an eighth coding rate threshold; there is a second type of base matrix, in a subset of base matrices with the coding rate being less than the eighth coding rate threshold; where the eighth coding rate threshold is a positive real number less than 1.

In an example, the eighth coding rate threshold is equal to one of the following: 5/6, 3/4, 2/3, 3/5, 1/2, 2/5.

In an example, the eighth coding rate threshold is equal to 1/2; the base matrix set includes 3 non-empty subsets of base matrices corresponding to the code rates of: 1/2, 2/5 and 1/3, respectively. The base graph matrices with the coding rate of 1/2 are the base graph matrices 6 and 7 with the coding rate of 1/2 in the above embodiments, the base graph matrix with the code rate of 2/5 is the base graph matrix 8 with the coding rate of 2/5 in the above embodiments, and the base graph matrix with the coding rate of 1/3 is the base graph matrix 9 with the coding rate of 1/3 in the above embodiments. The eighth coding rate threshold may also be equal to other values, and examples will not be repeated herein.

In an embodiment, base matrices contained in a subset of base matrices for different comparison relationship between a coding rate and a ninth coding rate threshold, and different comparison relationship between a coding rate and a tenth coding rate threshold, are described. A process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

The base matrix set includes at least 2 non-empty subsets of base matrices, and all base matrices in each subset of base matrices have a same coding rate.

In an instance, there is a first type of base matrix, in a subset of base matrices with the coding rate being greater than or equal to a ninth coding rate threshold; there are both a first type of base matrix and a second type of base matrix, in a subset of base matrices with the coding rate being less than the ninth coding rate threshold and greater than or equal to a tenth coding rate threshold; there is a second type of base matrix, in a subset of base matrices with the coding rate being less than the tenth coding rate threshold; where the ninth coding rate threshold is greater than the tenth coding rate threshold, and the ninth coding rate threshold and the tenth coding rate threshold are both positive real numbers less than 1.

In an example, the ninth coding rate threshold is equal to one of the following: 5/6, 3/4, 2/3, 3/5, 1/2, 2/5. The tenth coding rate threshold is equal to one of the following: 5/6, 3/4, 2/3, 3/5, 1/2, 2/5.

In an example, the ninth coding rate threshold is equal to 2/3, and the tenth coding rate threshold is equal to 1/2; where the base matrix set includes 7 non-empty subsets of base matrices corresponding to coding rates of: 8/9, 5/6, 3/4, 2/3, 1/2, 2/5, and 1/3, respectively; where the base graph matrix of each coding rate is the base graph matrix of each coding rate in the above embodiments.

The ninth coding rate threshold may also be equal to other values, and examples will not be repeated herein.

In an example, the ninth coding rate threshold is greater than the tenth coding rate threshold.

In an embodiment, base matrices contained in a subset of base matrices for different comparison relationship between a coding rate and an eleventh coding rate threshold, and different comparison relationship between a coding rate and a twelfth coding rate threshold, are described. The coding method of this instance includes the following steps.

Step 1, determining a coding rate R to be used.

Step 2, determining a base matrix for LDPC coding from a preset base matrix set based on the coding rate R.

Herein, the base matrix includes at least two kinds of elements including: an element indicating an all-zero square matrix, an element indicating a cyclic shift of an identity matrix.

Step 3, performing LDPC coding based on the base matrix to obtain coded data.

Step 4, transmitting the coded data to a second transmission node.

In an instance, there is only the first type of base matrix, in a subset of base matrices with the coding rate being greater than or equal to an eleventh coding rate threshold; there is only the second type of base matrix, in a subset of base matrices with the coding rate being less than or equal to a twelfth coding rate threshold; where the eleventh coding rate threshold and the twelfth coding rate threshold are both positive real numbers less than 1.

In an example, the eleventh coding rate threshold is equal to one of the following: 5/6, 3/4, 2/3, 3/5, 1/2, 2/5. The twelfth coding rate threshold is equal to one of the following: 5/6, 3/4, 2/3, 3/5, 1/2, 2/5.

In an example, the eleventh coding rate threshold is greater than the twelfth coding rate threshold.

In an example, the eleventh coding rate threshold is equal to 2/3, and the twelfth coding rate threshold is equal to 2/5. Herein, the base matrix set includes 6 non-empty subsets of base matrices corresponding to the coding rates of 8/9, 5/6, 3/4, 2/3, 2/5, and 1/3, respectively:

the base graph matrix with the coding rate of 8/9 is the base graph matrix 1 with the coding rate of 8/9 in the above embodiments;

the base graph matrix with the coding rate of 5/6 is the base graph matrix 2 with the coding rate of 5/6 in the above embodiments;

the base graph matrix with the coding rate of 3/4 is the base graph matrix 3 with the coding rate of 3/4 in the above embodiments;

the base graph matrix with the coding rate of 2/30 is the base graph matrix 5 with the coding rate of 2/3 in the above embodiments;

the base graph matrix with the coding rate of 2/5 is the base graph matrix 8 with the coding rate of 2/5 in the above embodiments;

the base graph matrix with the coding rate of 1/3 is the base graph matrix 9 with the coding rate of 1/3 in the above embodiments.

That is, in any subset of base matrices with the coding rate being greater than or equal to the eleventh coding rate threshold (e.g., 2/3), there is only the first type of base matrix; in all subsets of base matrices with the coding rate being less than or equal to the twelfth coding rate threshold (e.g., 2/5), there is only the second type of base matrix. The beneficial effect of such designed LDPC code is that: the performance of the first type of base matrix at a high code rate and the performance of the second type of base matrix at a low code rate may be fully utilized, and thus, the overall performance of the LDPC code may be optimized.

In an embodiment, the coding method of this instance includes the following steps.

Step 1, determining a coding rate R and a transmission block size to be used.

Step 2, determining a base matrix for LDPC coding from a preset base matrix set based on the coding rate R and the transmission block size.

Herein, the base matrix includes at least two kinds of elements including: an element indicating an all-zero square matrix, an element indicating a cyclic shift of an identity matrix.

Step 3, performing LDPC coding based on the base matrix to obtain coded data.

Step 4, transmitting the coded data to a second transmission node.

Herein, the base matrix set includes 3 non-empty subsets of base matrices corresponding to the coding rates of: 8/9, 3/4, and 1/2, respectively:

herein, the base graph matrix with the coding rate of 8/9 is the base graph matrix 1 with the coding rate of 8/9 in the above embodiments;

the base graph matrix with the coding rate of 3/4 is the base graph matrix 3 with the coding rate of 3/4 in the above embodiments;

the base graph matrices with the coding rate of 1/2 are the base graph matrices 6 and 7 with the coding rate of 1/2 in the above embodiments.

That is, there is a coding rate threshold R0=3/4, and in any subset of base matrices with the coding rate R>=R0, there is only the first type of base matrix; there is a coding rate threshold R1=1/2, and in all subsets of base matrices with the coding rates R<=R1, both the first type of base matrix and the second type of base matrix are included; where R0 is greater than or equal to R1. The beneficial effect of such designed LDPC code is that: the performance of the first type of base matrix at a high code rate may be fully utilized, and the base graph matrix with the bi-diagonal structure and the base graph matrix with the single-diagonal structure are adopted under partial code rates and thus, the overall performance of the LDPC code may be optimized.

The coding rate R0 may also be equal to other values, such as 2/3. The coding rate R1 may also be equal to other values, such as 2/5.

In an embodiment, the coding method of this instance includes the following steps.

Step 1, determining a coding rate R and a transmission block size to be used.

Step 2, determining a base matrix for LDPC coding from a preset base matrix set based on the coding rate R and the transmission block size.

Herein, the base matrix includes at least two kinds of elements including: an element indicating an all-zero square matrix, an element indicating a cyclic shift of an identity matrix.

Step 3, performing LDPC coding based on the base matrix to obtain coded data.

Step 4, transmitting the coded data to a second transmission node.

Herein, the base matrix set includes 1 non-empty subset of base matrices, corresponding to the coding rate of ½. The base graph matrices with the coding rate of ½ are the base graph matrices 6 and 7 with the coding rate of ½ in the above embodiments. That is, at this point, the base graph matrix of the base matrix corresponding to the coding rate of ½ includes both a first type of base matrix and a second type of base matrix.

In all subsets of base matrices with the coding rates R satisfying R3>R≥R4, both a first type of base matrix and a second type of base matrix are included, where R3=2/3 and R4=½.

In an embodiment, a process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

The base matrix set includes at least 2 non-empty subsets of base matrices, and all base matrices in each subset of base matrices have a same coding rate.

In an instance, there is only the first type of base matrix, in a subset of base matrices with the coding rate being greater than or equal to a first coding rate threshold; there is at least one subset of base matrices with the coding rate being less than the first coding rate threshold, and there is at least one base matrix not belonging to a first type of base matrix in any subset of base matrices with the coding rate being less than the first coding rate threshold; where the first coding rate threshold is a positive real number less than 1.

In an example, the first coding rate threshold is equal to one of the following: 5/6, 3/4, 2/3, 3/5, ½, 2/5, 1/3.

In an example, the first coding rate threshold is equal to 2/3. The base matrix set includes 3 non-empty subsets of base matrices corresponding to the code rates of: 5/6, 3/4 and ½, respectively. The base graph matrix with the code rate of 5/6 is the base graph matrix 2 with the coding rate of 5/6 in the above embodiments, the base graph matrices with the code rate of 2/3 are the base graph matrices 4 and 5 with the coding rate of 2/3 in the above embodiments, and the base graph matrices with the code rate of ½ are the base graph matrices 6 and 7 with the coding rate of ½ in the above embodiments.

In an instance, there is only the second type of base matrix, in a subset of base matrices with the coding rate being less than or equal to a second coding rate threshold; there is at least one subset of base matrices with the coding rate being greater than the second coding rate threshold, and there is at least one base matrix not belonging to a second type of base matrix in a subset of base matrices with the coding rate being greater than the second coding rate threshold; where the second coding rate threshold is a positive real number less than 1.

In an example, the second coding rate threshold is equal to one of the following: 5/6, 3/4, 2/3, 3/5, ½, 2/5, 1/3.

In an example, the second coding rate threshold is equal to 2/5; in this instance, the base matrix set includes 3 non-empty subsets of base matrices corresponding to the code rates of: 5/6, 2/5, and 1/3, respectively; the base graph matrix with the code rate of 5/6 is the base graph matrix 2 with the coding rate of 5/6 in the above embodiments, the base graph matrix with the code rate of 2/5 is the base graph matrix 8 with the coding rate of 2/5 in the above embodiments, and the base graph matrix with the code rate of 1/3 is the base graph matrix 9 with the coding rate of 1/3 in the above embodiments.

In an instance, the first coding rate threshold is greater than the second coding rate threshold.

In an embodiment, the coding method of this instance includes the following steps.

Step 1, determining a coding rate R and a transmission block size to be used.

Step 2, determining a base matrix for LDPC coding from a preset base matrix set based on the coding rate R and the transmission block size.

Herein, the base matrix includes at least two kinds of elements including: an element indicating an all-zero square matrix, an element indicating a cyclic shift of an identity matrix.

Step 3, performing LDPC coding based on the base matrix to obtain coded data.

Step 4, transmitting the coded data to a second transmission node.

The base matrix set includes at least 2 non-empty subsets of base matrices, and all base matrices in each subset of base matrices have a same coding rate.

In an instance, in the base matrix set, subsets of base matrices corresponding to all coding rates include both a first type of base matrix and a second type of base matrix.

In an example, the base matrix set includes 3 non-empty subsets of base matrices corresponding to coding rates of: 2/3, ½, and 2/5. The base graph matrices with the coding rate of ½ are the base graph matrices 6 and 7 with the coding rate of ½ in the above embodiments.

The subset of base matrices corresponding to the coding rate of 2/3 contains 2 base graph matrices, as follows:
  a first base graph matrix (bi-diagonal structure) is the base graph matrix 4 with the coding rate of 2/3 described in the above embodiments;
  base graph matrix 10 (single-diagonal structure):

| 1 | 0 | 1 | 0 | 0 | 0 | 0 | 0 | 1 | 0 | 1 | 0 | 1 | 0 | 1 | 1 | 1 | 1 | 0 | 0 | 0 | 0 | 0 | 0 | 0 |
| 0 | 1 | 0 | 1 | 1 | 1 | 1 | 0 | 0 | 0 | 1 | 0 | 0 | 0 | 0 | 0 | 0 | 1 | 1 | 0 | 0 | 0 | 0 | 0 | 0 |
| 1 | 0 | 0 | 0 | 1 | 0 | 0 | 1 | 1 | 0 | 0 | 1 | 0 | 1 | 1 | 0 | 1 | 0 | 1 | 1 | 0 | 0 | 0 | 0 | 0 |

-continued

```
0 1 1 1 0 1 0 0 0 1 0 1 0 1 0 0 1 0 0 1 0 0 0 0
1 1 0 0 1 0 0 0 0 1 0 0 0 0 1 1 0 0 0 1 0 0 0 0
0 1 0 1 0 0 1 0 0 0 0 0 0 0 0 0 1 0 0 1 0 0 0 0
1 0 0 0 0 1 1 1 0 0 0 1 0 0 0 0 0 1 0 0 1 0 0 0
1 0 0 0 0 0 0 0 0 0 0 0 1 0 0 0 1 0 0 0 0 1 0 0
1 1 1 0 0 0 0 0 0 0 0 1 0 0 0 0 0 1 0 0 0 0 1 0
1 1 1 0 1 1 0 1 1 1 1 0 0 1 1 1 0 0 0 0 0 0 0 1
```

The subset of base matrices corresponding to the coding rate of ½ contains 2 base graph matrices, as follows:
  a first base graph matrix (bi-diagonal structure) is the base graph matrix 6 with the coding rate of ½ described in the above embodiments;
  a second base graph matrix (single-diagonal structure) is the base graph matrix 7 with the coding rate of ½ described in the above embodiments.

The subset of base matrices corresponding to the coding rate of ⅖ contains 2 base graph matrices, as follows:
  first base graph matrix 11 (bi-diagonal structure):

```
0 1 0 1 0 0 0 0 0 0 0 0 0 0 0 1 1 0 0 0
1 1 0 0 1 0 0 0 0 0 0 1 0 0 0 0 1 1 0 0
1 1 0 0 0 1 0 0 0 0 0 0 0 0 0 0 0 1 1 0
0 1 0 1 0 0 0 0 0 0 0 0 1 0 0 0 0 0 1 1 0
0 1 1 0 0 0 0 0 1 0 1 0 0 0 0 1 0 0 0 1 1
0 1 0 0 0 0 0 0 0 1 0 0 0 1 0 0 0 0 0 0 1
1 1 0 0 0 0 1 0 0 1 0 0 0 0 0 0 0 0 0 0
0 1 0 0 0 0 0 0 0 0 1 1 0 0 0 0 0 0 0 0
1 0 0 1 1 0 0 0 0 0 0 0 0 0 1 0 0 0 0 0
1 0 0 0 0 0 0 1 0 0 0 0 0 0 0 0 0 0 0 0
1 0 0 0 0 0 0 1 0 0 0 1 0 0 0 0 0 0 0 0
1 1 0 0 0 1 0 0 0 1 0 0 0 0 0 0 0 0 0 0
1 1 0 0 0 0 0 0 0 0 0 0 1 1 1 0 0 0 0 0
1 1 1 0 0 1 0 0 0 0 0 0 0 1 0 0 0 0 0 0
1 0 0 0 0 0 0 0 0 1 0 0 0 0 0 0 0 0 0 0
1 1 0 0 0 0 0 0 0 0 0 0 0 0 0 0 0 0 0 0
1 1 1 0 0 0 0 0 0 0 0 0 0 1 0 0 0 0 0 0
0 0 0 0 0 0 1 0 0 0 0 0 0 0 0 0 0 0 0 0
0 0 0 0 0 1 0 1 0 0 0 0 0 0 0 0 0 0 0 0
1 1 0 0 0 0 0 0 0 0 0 0 1 0 0 0 0 0 0 0
1 0 0 0 1 0 0 0 0 0 0 0 1 0 0 0 0 0 0 0
1 1 0 0 0 0 0 0 0 0 0 0 1 0 0 0 0 0 0 0
0 1 0 0 1 0 0 1 1 0 1 0 0 0 0 0 0 0 0 0
1 1 0 0 1 0 0 0 0 0 0 1 0 0 0 0 0 0 0 0
1 1 0 0 0 0 1 0 0 0 0 0 0 0 0 0 0 0 0 0
1 0 0 0 0 0 0 0 0 0 0 0 0 0 1 0 0 0 0 0
```

```
0 0 0 0 0 0 0 0 0 0 0 0 0 0 0 0 0 0 0 0
0 0 0 0 0 0 0 0 0 0 0 0 0 0 0 0 0 0 0 0
0 0 0 0 0 0 0 0 0 0 0 0 0 0 0 0 0 0 0 0
0 0 0 0 0 0 0 0 0 0 0 0 0 0 0 0 0 0 0 0
0 0 0 0 0 0 0 0 0 0 0 0 0 0 0 0 0 0 0 0
0 0 0 0 0 0 0 0 0 0 0 0 0 0 0 0 0 0 0 0
1 0 0 0 0 0 0 0 0 0 0 0 0 0 0 0 0 0 0 0
1 1 0 0 0 0 0 0 0 0 0 0 0 0 0 0 0 0 0 0
0 1 1 0 0 0 0 0 0 0 0 0 0 0 0 0 0 0 0 0
0 0 1 1 0 0 0 0 0 0 0 0 0 0 0 0 0 0 0 0
0 0 0 1 1 0 0 0 0 0 0 0 0 0 0 0 0 0 0 0
0 0 0 0 1 1 0 0 0 0 0 0 0 0 0 0 0 0 0 0
0 0 0 0 0 1 1 0 0 0 0 0 0 0 0 0 0 0 0 0
0 0 0 0 0 0 1 1 0 0 0 0 0 0 0 0 0 0 0 0
0 0 0 0 0 0 0 1 1 0 0 0 0 0 0 0 0 0 0 0
0 0 0 0 0 0 0 0 1 1 0 0 0 0 0 0 0 0 0 0
0 0 0 0 0 0 0 0 0 1 1 0 0 0 0 0 0 0 0 0
0 0 0 0 0 0 0 0 0 0 1 1 0 0 0 0 0 0 0 0
0 0 0 0 0 0 0 0 0 0 0 1 1 0 0 0 0 0 0 0
0 0 0 0 0 0 0 0 0 0 0 0 1 1 0 0 0 0 0 0
0 0 0 0 0 0 0 0 0 0 0 0 0 1 1 0 0 0 0 0
0 0 0 0 0 0 0 0 0 0 0 0 0 0 1 1 0 0 0 0
0 0 0 0 0 0 0 0 0 0 0 0 0 0 0 1 1 0 0 0
0 0 0 0 0 0 0 0 0 0 0 0 0 0 0 0 1 1 0 0
0 0 0 0 0 0 0 0 0 0 0 0 0 0 0 0 0 1 1 0
0 0 0 0 0 0 0 0 0 0 0 0 0 0 0 0 0 0 1 1
0 0 0 0 0 0 0 0 0 0 0 0 0 0 0 0 0 0 0 1
```

A second base graph matrix (single-diagonal structure) is the base graph matrix 8 with the coding rate of ⅔ described in instance 1.

That is, in this instance, base graph matrices of base matrices corresponding to all coding rates (including: ⅔, ½, and ⅖) contain both a first type of base matrix and a second type of base matrix. The performance of the first type of base matrix and the second type of base matrix may be fully utilized, not only the waterfall zone performance of the LDPC code but also the error floor performance may be improved, and thus, the overall block error rate performance of the LDPC code may be optimized.

In an embodiment, a process of the coding processing in this embodiment includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

In an instance, the base matrix set at least includes one base matrix in the second type of base matrix. The base graph matrix belonging to the second type of base matrix in the base matrix set at least includes: a maximum row weight difference of a sub-matrix consisting of a-th row to the tail row and b-th column to c-th column in the base graph matrix is equal to 0, 1, or 2; where the maximum row weight difference refers to a difference between a maximum row weight of the formed sub-matrix and a minimum row weight of the formed sub-matrix. a is an integer greater than 1, b is an integer greater than 0, and c is an integer greater than b. In this example, the count starts from 0.

In an example, a is equal to M−P; c is equal to N−P−1; where M is a number of rows of the base matrix, N is a number of columns of the base matrix, N is an integer greater than P, M is an integer greater than P+2, and P is an integer greater than 2. In an example, b is equal to 1 or 2. In an example, b is equal to a number of system columns not transmitted in the LDPC coding, i.e., a number of columns of the base matrix corresponding to a system bit not contained in coded data obtained from the LDPC coding. Such designed base graph matrix achieves better error floor performance. In an example, a is equal to 3, 4, 5, or 6.

In an embodiment, the coding method of this instance includes the following steps.

Step 1, determining a base matrix for LDPC coding.

Herein, the base matrix includes at least two kinds of elements including: an element indicating an all-zero square matrix, an element indicating a cyclic shift of an identity matrix.

Step 2, performing LDPC coding based on the base matrix to obtain coded data.

Step 3, transmitting the coded data to a second transmission node.

In an instance, there is a first type of base matrix, in a subset of base matrices with the coding rate being greater than or equal to a seventh coding rate threshold; there are both a first type of base matrix and a second type of base matrix, in a subset of base matrices with the coding rate being less than the seventh coding rate threshold; where the seventh coding rate threshold is a positive real number less than 1.

In an example, the seventh coding rate threshold is equal to one of the following: ⅞, ⅚, ¾, ⅔, ⅗, ½, ⅖.

In an instance, there are both a first type of base matrix and a second type of base matrix, in a subset of base matrices with the coding rate being greater than or equal to an eighth coding rate threshold; there is a second type of base matrix, in a subset of base matrices with the coding rate being less than the eighth coding rate threshold; where the eighth coding rate threshold is a positive real number less than 1.

In an example, the eighth coding rate threshold is equal to one of the following: ⅚, ¾, ⅔, ⅗, ½, ⅖, ⅓.

In an instance, there is only the first type of base matrix, in a subset of base matrices with the coding rate being greater than or equal to a ninth coding rate threshold; there are both a first type of base matrix and a second type of base matrix, in a subset of base matrices with the coding rate being less than the ninth coding rate threshold and greater than or equal to a tenth coding rate threshold; there is only the second type of base matrix, in a subset of base matrices with the coding rate being less than the tenth coding rate threshold; where the ninth coding rate threshold is greater than the tenth coding rate threshold, and the ninth coding rate threshold and the tenth coding rate threshold are both positive real numbers less than 1.

In an example, the ninth coding rate threshold is equal to one of the following: ⅞, ⅚, ¾, ⅔, ⅗, ½, ⅖. In an example, the tenth coding rate threshold is equal to one of the following: ⅚, ¾, ⅔, ⅗, ½, ⅖, ⅓.

In an embodiment, the coding method of this instance includes the following steps.

Step 1, determining a base matrix for LDPC coding.

Herein, the base matrix includes at least two kinds of elements including: an element indicating an all-zero square matrix, an element indicating a cyclic shift of an identity matrix.

Step 2, performing LDPC coding based on the base matrix to obtain coded data.

Step 3, transmitting the coded data to a second transmission node.

Herein, a base graph matrix of the base matrix at least includes 1 base graph matrix in the above embodiments.

In an embodiment, the coding method of this instance includes the following steps.

Step 1, determining a base matrix for LDPC coding from a preset base matrix set; where the base matrix includes at least two kinds of elements including: an element indicating an all-zero square matrix, and an element indicating a cyclic shift of an identity matrix.

Step 2, performing LDPC coding based on the base matrix to obtain coded data.

Step 3, transmitting the coded data to a second transmission node.

In an instance, a base graph matrix of the base matrix includes at least 1 base graph matrix in the above embodiments.

Herein, all the base graph matrices in the above embodiments may be described in the form of a sparse matrix, such as only defining and describing indexes (row indexes and column indexes) of elements indicating the cyclic shift of the identity matrix in the base graph matrix, i.e., only defining and describing "1" elements in the base graph matrix, which are defined by row indexes and column indexes; but not defining "0" elements in the base graph matrix. In an example, the description of the sparse matrix form of the base graph matrix with the coding rate of ⅚ in instance 1 is shown as in the following table:

| Row index i | Column index j |
|---|---|
| 0 | 0, 6, 7, 8, 9, 10, 11, 16, 17, 18, 19, 20, 22, 23, 24, 25 |
| 1 | 0, 1, 3, 4, 5, 9, 10, 11, 13, 14, 15, 19, 20, 21, 25, 26 |
| 2 | 0, 1, 2, 4, 5, 7, 8, 11, 12, 14, 15, 17, 18, 24, 26, 27 |
| 3 | 0, 1, 2, 3, 5, 6, 8, 10, 12, 13, 15, 16, 18, 20, 22, 23, 27, 28 |
| 4 | 0, 1, 2, 3, 4, 6, 7, 9, 12, 13, 14, 16, 17, 19, 21, 23, 24, 28 |

In the base graph matrix, positions corresponding to the row index i and the column index j as defined above are "1" and the remaining positions are "0".

Figure 8:
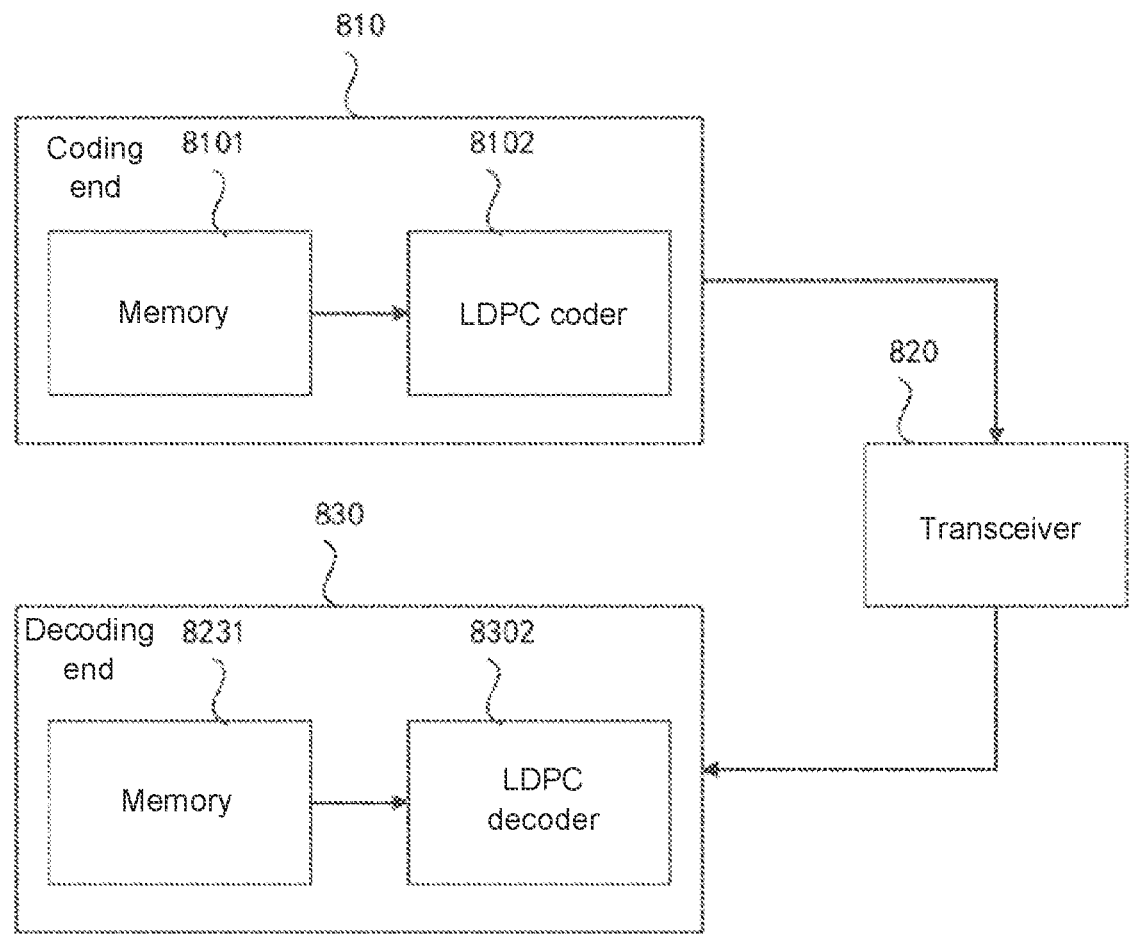
FIG. 8 is a structural block diagram of a coding and decoding system provided by the embodiments of the present disclosure.

In an embodiment, FIG. 8 is a structural block diagram of a coding and decoding system provided by the embodiments of the present disclosure. As shown in FIG. 8, the coding and decoding system in this embodiment includes: a coding end 810, a transceiver 820, and a decoding end 830; where the coding end 810 includes: a memory 8101 and an LDPC coder 8102; the decoding end 830 includes: a memory 8301 and an LDPC decoder 8302.

In an embodiment, the coding end 810 includes: the memory 8101 for storing a base matrix set; and the LDPC coder 8102 for determining a base matrix for LDPC coding from the base matrix set, and performing LDPC coding based on the base matrix.

The decoding end 830 includes: the memory 8301 for storing a base matrix set; the LDPC decoder 8302 for determining a base matrix for LDPC decoding from the base matrix set, and performing LDPC decoding based on the base matrix. The base matrix includes at least two kinds of elements including: an element indicating an all-zero square matrix, and an element indicating a cyclic shift of an identity matrix.

In an embodiment, the base matrix set includes 2 non-empty subsets of base matrices, and all base matrices in each subset of base matrices have a same coding rate.

In an embodiment, any of the base matrix sets includes at least one base matrix in the first type of base matrix and the second type of base matrix. A sub-matrix consisting of last M columns in a base graph matrix of the first type of base matrix has a bi-diagonal structure, M is a number of rows of the base graph matrix, and M is a positive integer. A sub-matrix consisting of last P columns in a base graph matrix of the second type of base matrix has a single-diagonal structure, where P is a positive integer, and P>2.

Herein, the base matrix set in the memory has all the technical features as in the above embodiments, and a corresponding instance thereof is also the same as in the above embodiments, which will not be repeated herein.

Figure 9:
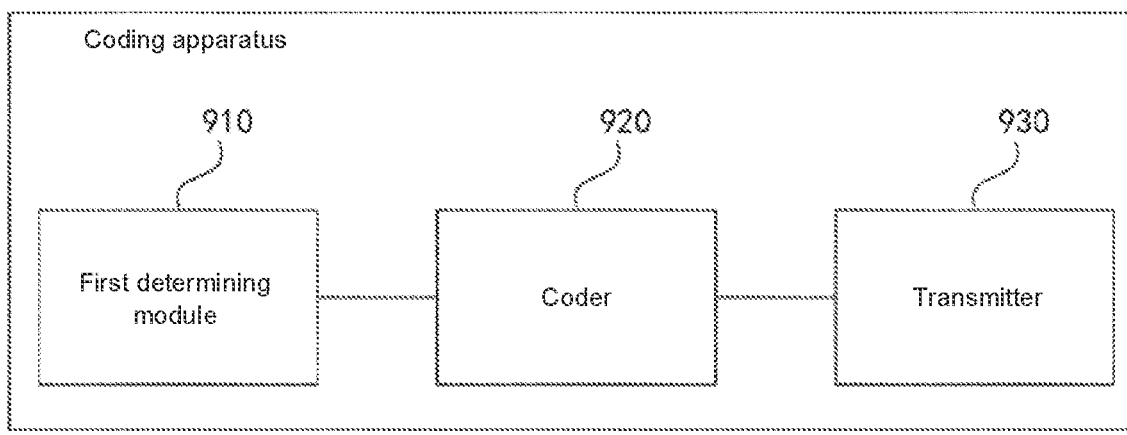
FIG. 9 is a structural block diagram of a coding apparatus provided by the embodiments of the present disclosure.

In an embodiment, FIG. 9 is a structural block diagram of a coding apparatus provided by the embodiments of the present disclosure. This embodiment is applied to a communication device. Herein, the communication device may be a coding end. As shown in FIG. 9, this embodiment includes: a first determining module 910, a coder 920, and a transmitter 930.

Herein, the first determining module 910 is configured to determine a base matrix for LDPC coding from a preset base matrix set.

The coder 920 is configured to perform LDPC coding on original data according to the base matrix, so as to obtain coded data.

The transmitter 930 is configured to transmit the coded data to a second transmission node.

Herein, the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate.

In an embodiment, the each subset includes at least one of: a base matrix in a first type of base matrix; a base matrix in a second type of base matrix;
where a sub-matrix consisting of last M columns in a base graph matrix of a base matrix in the first type of base matrix has a bi-diagonal structure, where M is a number of rows of the base matrix in the first type of base matrix and is a positive integer;
a sub-matrix consisting of last P columns in a base graph matrix of a base matrix in the second type of base matrix has a single-diagonal structure, where P is an integer greater than 2.

In an embodiment, there is only the first type of base matrix, in a subset of base matrices with the coding rate being greater than or equal to a first coding rate threshold; there is at least one subset of base matrices with the coding rate being less than the first coding rate threshold, and there is no first type of base matrix in a subset of base matrices with the coding rate being less than the first coding rate threshold; where the first coding rate threshold is a positive real number less than 1.

In an embodiment, there is only the first type of base matrix, in a subset of base matrices with the coding rate being greater than or equal to a first coding rate threshold; there is only the second type of base matrix, in a subset of base matrices with the coding rate being less than the first coding rate threshold; where the first coding rate threshold is a positive real number less than 1.

In an embodiment, there is only the second type of base matrix, in a subset of base matrices with the coding rate being less than or equal to a second coding rate threshold; there is at least one subset of base matrices with the coding rate being greater than the second coding rate threshold, and there is no second type of base matrix in a subset of base matrices with the coding rate being greater than the second coding rate threshold; where the second coding rate threshold is a positive real number less than 1.

In an embodiment, there are both a first type of base matrix and a second type of base matrix, in a subset of base matrices with the coding rate being greater than or equal to a third coding rate threshold; where the third coding rate threshold is a positive real number less than 1.

In an embodiment, there are both a first type of base matrix and a second type of base matrix, in a subset of base matrices with the coding rate being less than or equal to a fourth coding rate threshold; where the fourth coding rate threshold is a positive real number less than 1.

In an embodiment, there are both a first type of base matrix and a second type of base matrix, in a subset of base matrices with the coding rate being less than or equal to a fifth coding rate threshold and greater than a sixth coding rate threshold; where the sixth coding rate threshold is less than the fifth coding rate threshold, the fifth coding rate threshold is a positive real number less than 8/9, and the sixth coding rate threshold is greater than 1/3.

In an embodiment, there is a first type of base matrix, in a subset of base matrices with the coding rate being greater than or equal to a seventh coding rate threshold; there are both a first type of base matrix and a second type of base matrix, in a subset of base matrices with the coding rate being less than the seventh coding rate threshold; where the seventh coding rate threshold is a positive real number less than 1.

In an embodiment, there is a first type of base matrix, in a subset of base matrices with the coding rate being greater than or equal to a seventh coding rate threshold; there are both a first type of base matrix and a second type of base matrix in a subset of base matrices with the coding rate being less than the seventh coding rate threshold.

In an embodiment, there are both a first type of base matrix and a second type of base matrix, in a subset of base matrices with the coding rate being greater than or equal to an eighth coding rate threshold; there is a second type of base matrix, in a subset of base matrices with the coding rate being less than the eighth coding rate threshold; where the eighth coding rate threshold is a positive real number less than 1.

In an embodiment, there are both the first type of base matrix and the second type of base matrix in a subset of base matrices with the coding rate being greater than or equal to an eighth coding rate threshold; there is only the second type of base matrix, in a subset of base matrices with the coding rate being less than the eighth coding rate threshold.

In an embodiment, there is a first type of base matrix, in a subset of base matrices with the coding rate being greater than or equal to a ninth coding rate threshold; there are both a first type of base matrix and a second type of base matrix, in a subset of base matrices with the coding rate being less than the ninth coding rate threshold and greater than or equal to a tenth coding rate threshold; there is a second type of base matrix, in a subset of base matrices with the coding rate being less than the tenth coding rate threshold; where the ninth coding rate threshold is greater than the tenth coding rate threshold, and the ninth coding rate threshold and the tenth coding rate threshold are both positive real numbers less than 1.

In an embodiment, there is only the first type of base matrix, in a subset of base matrices with the coding rate being greater than or equal to a ninth coding rate threshold; there are both a first type of base matrix and a second type of base matrix, in a subset of base matrices with the coding rate being less than the ninth coding rate threshold and greater than or equal to a tenth coding rate threshold; there is only the second type of base matrix, in a subset of base matrices with the coding rate being less than the tenth coding rate threshold.

In an embodiment, there is only the first type of base matrix, in a subset of base matrices with the coding rate being greater than or equal to an eleventh coding rate threshold; there is only the second type of base matrix, in a subset of base matrices with the coding rate being less than or equal to a twelfth coding rate threshold; where the eleventh coding rate threshold and the twelfth coding rate threshold are both positive real numbers less than 1. In an embodiment, the eleventh coding rate threshold is greater than the twelfth coding rate threshold.

In an embodiment, there is at least one subset of base matrices in the base matrix set and including both the first type of base matrix and the second type of base matrix.

In an embodiment, in the base matrix set, there is at least one subset of base matrices with a first coding rate, and including both the first type of base matrix and the second type of base matrix; there is at least one subset of base matrices with a coding rate being a second coding rate, and including only the first type of base matrix; where the first coding rate is less than the second coding rate.

In an embodiment, in the base matrix set, there is at least one subset of base matrices with a third coding rate, and including both the first type of base matrix and the second type of base matrix; there is at least one subset of base matrices with a fourth coding rate, and including only the second type of base matrix; where the third coding rate is greater than the fourth coding rate.

In an embodiment, in the base matrix set, there is at least one subset of base matrices with a fifth coding rate, and including only the first type of base matrix; and there is at least one subset of base matrices with a sixth coding rate, and including the second type of base matrix only; where the fifth coding rate is greater than the sixth coding rate.

In an embodiment, in the base matrix set, there is at least one subset of base matrices with a coding rate, and including both the first type of base matrix and the second type of base matrix, the coding rate includes one of: $3/4$, $2/3$, $5/8$, $3/5$, $1/2$, $2/5$.

In an embodiment, in the base matrix set, all subsets of base matrices corresponding to coding rates include both the first type of base matrix and the second type of base matrix.

In an embodiment, in the base matrix set, all base matrices in each subset of base matrices correspond to a same coding rate.

The encoding apparatus provided by this embodiment is configured to implement the coding method of the embodiments shown in FIG. 1, and the implementation principle and the technical effect of the encoding apparatus provided by this embodiment are similar, which will not be repeated herein.

Figure 10:
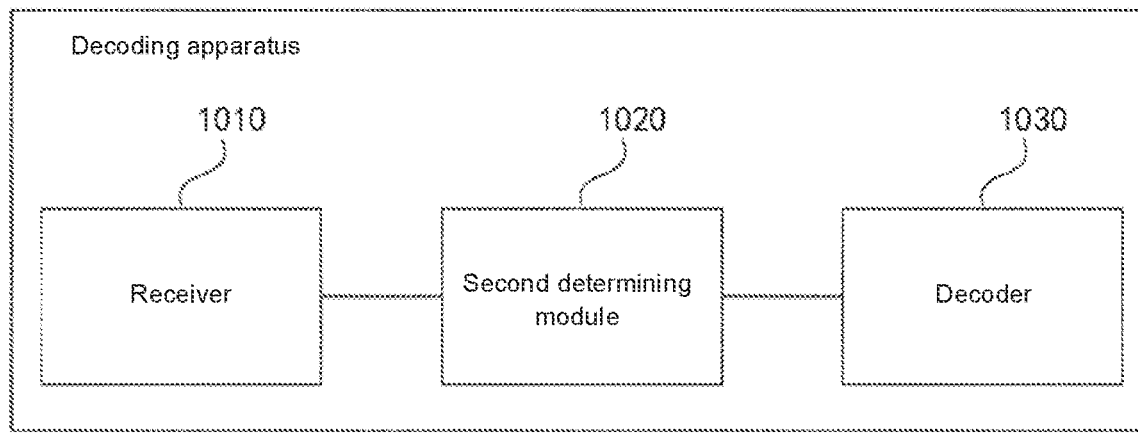
FIG. 10 is a structural block diagram of a decoding apparatus provided by the embodiments of the present disclosure.

In an embodiment, FIG. 10 is a structural block diagram of a decoding apparatus provided by the embodiments of the present disclosure. This embodiment is applied to a communication device. Herein, the communication device may be a decoding end. As shown in FIG. 10, the decoding apparatus in this embodiment includes: a receiver 1010, a second determining module 1020, and a decoder 1030.

The receiver 1010 is configured to receive coded data transmitted by a first transmission node.

The second determining module 1020 is configured to determine a base matrix for LDPC decoding from a preset base matrix set.

The decoder 1030 is configured to perform LDPC decoding on the coded data according to the base matrix to obtain original data.

Herein, the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate.

The decoding apparatus provided by this embodiment is configured to implement the decoding method of the embodiments shown in FIG. 2, and the implementation principle and the technical effect of the decoding apparatus provided by this embodiment are similar, which will not be repeated herein.

Figure 11:
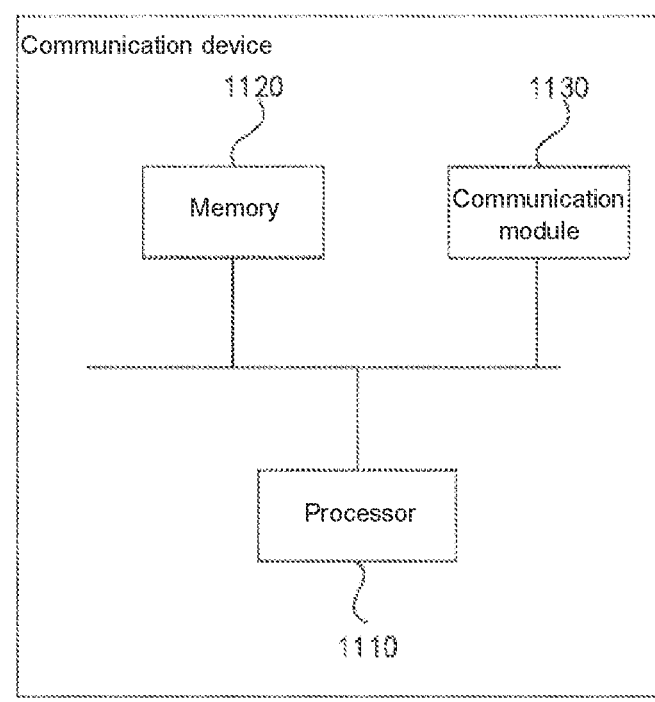
FIG. 11 is a structural schematic diagram of a communication device provided by the embodiments of the present disclosure.

FIG. 11 is a structural schematic diagram of a communication device provided by the embodiments of the present disclosure. As shown in FIG. 11, the device provided by the present disclosure, includes: a processor 1110, a memory 1120, and a communication module 1130. A number of processors 1110 in this device may be one or more, and one processor 1110 is taken as an example in FIG. 11. A number of memories 1120 in this device may be one or more, and one memory 1120 is taken as an example in FIG. 11. The processor 1110, the memory 1120 and the communication module 1130 of this device may be connected by a bus or in other ways, and in FIG. 11, the connection through the bus is taken as an example. In this embodiment, this device may be a coding end (e.g., the coding end may be a terminal device such as a user equipment, etc.).

The memory 1120, as a computer-readable storage medium, may be configured to store a software program, a computer-executable program and module, such as a program instruction/module corresponding to the device of any embodiment of the present disclosure (e.g., the first determining module 910, the coder 920, and the transmitter 930 in the encoding apparatus). The memory 1120 may include a storage program area and a storage data area, where the storage program area may store the operating system and applications required by at least one function; the storage data area may store data created according to the usage of the device, and the like. In addition, the memory 1120 may include a high-speed random access memory, and may further include a non-volatile memory, for example, at least one disk storage device, a flash memory device, or another non-volatile solid-state storage device. In some instances, the memory 1120 may further include memories that are remotely located relative to the processor 1110, and these remote memories may be connected to the device by a network. Instances of the network above include, but are not limited to, the Internet, an enterprise intranet, a local area network, a mobile communication network, and combinations thereof.

The communication module 1130 is configured for communication interaction with other transmission nodes.

In a case where the communication device is the first transmission node, the device provided above may be configured to perform the coding method applied to the first transmission node provided by any of the above embodiments, and have the corresponding function and effect.

In a case where the communication device is a second transmission node, the device provided above may be configured to perform the decoding method applied to the second transmission node provided by any of the above embodiments, and have the corresponding function and effect.

The embodiments of the present disclosure further provide a storage medium including computer-executable instructions, the computer-executable instructions, upon being executed by a computer processor, are configured to perform a coding method applied to a first transmission node, where the method includes: determining a base matrix for LDPC coding from a preset base matrix set; performing LDPC coding on original data according to the base matrix, so as to obtain coded data; transmitting the coded data to a second transmission node; where the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate.

The embodiments of the present disclosure further provide a storage medium including computer-executable instructions, the computer-executable instructions, upon being executed by a computer processor, are configured to perform a decoding method applied to a second transmission node, where the method includes: receiving coded data transmitted by a first transmission node; determining a base matrix for LDPC coding from a preset base matrix set; performing LDPC decoding on the coded data according to the base matrix, so as to obtain original data; where the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate.

Those skilled in the art should understand that, the term "user equipment" covers any suitable type of wireless user equipment, such as a mobile telephone, a portable data processing apparatus, a portable web browser, or an in-vehicle mobile station.

In general, multiple embodiments of the present disclosure may be implemented in a hardware or a specialized circuitry, a software, a logic, or any combination thereof. For example, some aspects may be implemented in a hardware, and other aspects may be implemented in a firmware or a software that may be executed by a controller, a microprocessor, or other computing device, although the present disclosure is not limited thereto.

The embodiments of the present disclosure may be implemented by performing computer program instructions by a data processor of a mobile apparatus, such as in a processor entity, or by a hardware, or by a combination of a software and a hardware. The computer program instructions may be an assembly instruction, an instruction set architecture (ISA) instruction, a machine instruction, a machine-related instruction, a microcode, a firmware instruction, state setting data, or a source code or object code written in any combination of one or more programming languages.

The block diagram of any of the logic flows in the drawings of the present disclosure may represent program steps, or may represent interconnected logic circuits, modules, and functions, or may represent a combination of program steps with logic circuits, modules, and functions. The computer program may be stored on a memory. The memory may have any type suitable for a local technological environment and may be implemented by using any suitable data storage technology, for example, but not limited to, a read-only memory (ROM), a random access memory (RAM), an optical memory apparatus and system (digital video disc (DVD) or compact disk (CD)) and the like. The computer-readable medium may include a non-transitory storage medium. The data processor may be any type suitable for a local technical environment, for example, but not limited to, a general purpose computer, a specialized computer, a microprocessor, a digital signal processor (Digital Signal Processing, DSP), an application specific integrated circuit (ASIC), a programmable logic device (Field-Programmable Gate Array, FPGA[[FGPA]]), and a processor based on a multi-core processor architecture.

What is claimed is:

1. A coding method, applied to a low density parity check (LDPC) coder, wherein the method comprises:
determining a base matrix for LDPC coding from a preset base matrix set;
performing LDPC coding on original data according to the base matrix, so as to obtain coded data;
transmitting the coded data to a second transmission node;
wherein the base matrix includes two kinds of elements: an element indicating an all-zero square matrix, and an element indicating a cyclic shift of an identity matrix;
the base matrix set includes at least two non-empty subsets of base matrices, and all base matrices in each subset of the at least two non-empty subsets of base matrices have a same coding rate;
the each subset comprises at least one of: a base matrix in a first type of base matrix; a base matrix in a second type of base matrix; wherein
a sub-matrix consisting of last M columns in a base graph matrix of a base matrix in the first type of base matrix has a bi-diagonal structure, wherein M is a number of rows of the base matrix in the first type of base matrix and is a positive integer;

a sub-matrix consisting of last P columns in a base graph matrix of a base matrix in the second type of base matrix has a single-diagonal structure, wherein P is an integer greater than 2.

2. The method according to claim 1, wherein there is only the first type of base matrix in a subset of base matrices with the coding rate being greater than or equal to a first coding rate threshold; there is at least one subset of base matrices with the coding rate being less than the first coding rate threshold, and there is no first type of base matrix in a subset of base matrices with the coding rate being less than the first coding rate threshold; wherein the first coding rate threshold is a positive real number less than 1.

3. The method according to claim 1, wherein there is only the second type of base matrix in a subset of base matrices with the coding rate being less than or equal to a second coding rate threshold; there is at least one subset of base matrices with the coding rate being greater than the second coding rate threshold, and there is no second type of base matrix in a subset of base matrices with the coding rate being greater than the second coding rate threshold; wherein the second coding rate threshold is a positive real number less than 1.

4. The method according to claim 1, wherein there are both the first type of base matrix and the second type of base matrix in a subset of base matrices with the coding rate being greater than or equal to a third coding rate threshold; wherein the third coding rate threshold is a positive real number less than 1.

5. The method according to claim 1, wherein there are both the first type of base matrix and the second type of base matrix in a subset of base matrices with the coding rate being less than or equal to a fourth coding rate threshold; wherein the fourth coding rate threshold is a positive real number less than 1.

6. The method according to claim 1, wherein there are both the first type of base matrix and the second type of base matrix in a subset of base matrices with the coding rate being less than or equal to a fifth coding rate threshold and greater than a sixth coding rate threshold; wherein the sixth coding rate threshold is less than the fifth coding rate threshold, the fifth coding rate threshold is a positive real number less than 8/9, and the sixth coding rate threshold is greater than 1/3.

7. The method according to claim 1, wherein there is the first type of base matrix in a subset of base matrices with the coding rate being greater than or equal to a seventh coding rate threshold; there are both the first type of base matrix and the second type of base matrix in a subset of base matrices with the coding rate being less than the seventh coding rate threshold; wherein the seventh coding rate threshold is a positive real number less than 1.

8. The method according to claim 1, wherein there are both the first type of base matrix and the second type of base matrix in a subset of base matrices with the coding rate being greater than or equal to an eighth coding rate threshold; there is the second type of base matrix in a subset of base matrices with the coding rate being less than the eighth coding rate threshold; wherein the eighth coding rate threshold is a positive real number less than 1.

9. The method according to claim 1, wherein there is the first type of base matrix in a subset of base matrices with the coding rate being greater than or equal to a ninth coding rate threshold; wherein there are both the first type of base matrix and the second type of base matrix in a subset of base matrices with the coding rate being less than the ninth coding rate threshold and greater than or equal to a tenth coding rate threshold; there is the second type of base matrix in a subset of base matrices with the coding rate being less than the tenth coding rate threshold; wherein the ninth coding rate threshold is greater than the tenth coding rate threshold, and the ninth coding rate threshold and the tenth coding rate threshold are a positive real number less than 1, respectively.

10. The method according to claim 1, wherein there is at least one subset of base matrices in the base matrix set, and comprising both the first type of base matrix and the second type of base matrix.

11. The method according to claim 1, wherein there is at least one subset of base matrices with a coding rate being a first coding rate in the base matrix set and comprising both the first type of base matrix and the second type of base matrix; there is at least one subset of base matrices with a coding rate being a second coding rate and comprising only the first type of base matrix; wherein the first coding rate is less than the second coding rate.

12. The method according to claim 1, wherein there is at least one subset of base matrices with a coding rate being a third coding rate in the base matrix set, and comprising both the first type of base matrix and the second type of base matrix; there is at least one subset of base matrices with a coding rate being a fourth coding rate, and comprising only the second type of base matrix; wherein the third coding rate is greater than the fourth coding rate.

13. The method according to claim 1, wherein there is at least one subset of base matrices with a coding rate being a fifth coding rate in the base matrix set, and comprising only the first type of base matrix; there is at least one subset of base matrices with a coding rate being a sixth coding rate and comprising only the second type of base matrix; wherein the fifth coding rate is greater than the sixth coding rate.

14. The method according to claim 1, wherein there is at least one subset of base matrices with a coding rate in the base matrix set, and comprising both the first type of base matrix and the second type of base matrix, the coding rate comprises one of: 3/4, 2/3, 5/8, 3/5, 1/2, 2/5.

15. The method according to claim 1, wherein in the base matrix set, all subsets of base matrices corresponding to coding rates comprise both the first type of base matrix and the second type of base matrix.

16. A communication device, comprising: a communication module, a non-transitory memory, and one or more processors;
wherein the communication module is configured to communicate with other transmission nodes;
the non-transitory memory is configured to store one or more programs;
the one or more programs, upon being executed by the one or more processors, cause the one or more processors to implement the method according to claim 1.

17. A non-transitory storage medium having stored a computer program thereon, the computer program, upon being executed by a processor, implements the method according to claim 1.

18. A decoding method, applied to a low density parity check (LDPC) decoder, wherein the method comprises:
receiving coded data transmitted by a first transmission node;
determining a base matrix for LDPC decoding from a preset base matrix set;
performing LDPC decoding on the coded data according to the base matrix, so as to obtain original data;

wherein the base matrix includes two kinds of elements: an element indicating an all-zero square matrix, and an element indicating a cyclic shift of an identity matrix; the base matrix set includes at least two non-empty subsets of base matrices, and all base matrices in each subset of the at least two non-empty subsets of base matrices have a same coding rate;

the each subset comprises at least one of: a base matrix in a first type of base matrix; a base matrix in a second type of base matrix; wherein a sub-matrix consisting of last M columns in a base graph matrix of a base matrix in the first type of base matrix has a bi-diagonal structure, wherein M is a number of rows of the base matrix in the first type of base matrix and is a positive integer;

a sub-matrix consisting of last P columns in a base graph matrix of a base matrix in the second type of base matrix has a single-diagonal structure, wherein P is an integer greater than 2.

19. A communication device, comprising: a communication module, a non-transitory memory, and one or more processors;

wherein the communication module is configured to communicate with other transmission nodes;

the non-transitory memory is configured to store one or more programs;

the one or more programs, upon being executed by the one or more processors, cause the one or more processors to implement the method according to claim 18.

* * * * *